(12) United States Patent
Yoshida et al.

(10) Patent No.: US 6,464,411 B1
(45) Date of Patent: Oct. 15, 2002

(54) CAMERA HAVING A FINGER DETECTING DEVICE

(75) Inventors: Hideo Yoshida; Kazuaki Nagata, both of Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/665,657

(22) Filed: Sep. 20, 2000

(30) Foreign Application Priority Data

Sep. 24, 1999 (JP) .......................................... 11-270353

(51) Int. Cl.$^7$ ............................. G03B 5/02; G03B 17/00
(52) U.S. Cl. ....................................... 396/349; 396/448
(58) Field of Search ............................... 396/263, 281, 396/283, 348, 349, 448

(56) References Cited

U.S. PATENT DOCUMENTS

| 5,600,390 A | * | 2/1997 | Tsuru et al. ................ 396/133 |
| 5,815,750 A |   | 9/1998 | Ishiguro ..................... 396/201 |
| 5,943,516 A | * | 8/1999 | Uchiyama et al. .......... 396/281 |
| 6,055,116 A | * | 4/2000 | Nomura et al. ............. 359/822 |

FOREIGN PATENT DOCUMENTS

| JP | 61-55099  | 11/1986 |
| JP | 7-27150   | 3/1995  |
| JP | 7-218807  | 8/1995  |
| JP | 9-297336  | 11/1997 |

* cited by examiner

*Primary Examiner*—David M. Gray
*Assistant Examiner*—Rochelle Blackman
(74) *Attorney, Agent, or Firm*—Young & Thompson

(57) ABSTRACT

Detection electrodes formed from a thin metal plate are attached to rear faces of a lens barrier, a lens barrel and a decorative sheet. The detection electrodes are respectively connected to phase-difference detection circuits used for the lens barrier and the lens barrel. High-frequency pulse signals of a detection side and a reference side are inputted into the phase-difference detection circuits. When a finger touches the lens barrier or the lens barrel, a phase of the detection-side pulse signal is delayed relative to a phase of the reference-side pulse signal by influence of capacitance applied to the detection electrodes. The phase-difference detection circuit detects the overlap of a finger from the delay of the detection-side pulse signal.

14 Claims, 20 Drawing Sheets

OUTPUT OF OSCILLATOR (HIGH-FREQUENCY PULSE SIGNAL)

DETECTION-SIDE PULSE SIGNAL (Va)
REFERENCE-SIDE PULSE SIGNAL (Vb)
DETECTION SIGNAL

DETECTION-SIDE PULSE SIGNAL (Va)
REFERENCE-SIDE PULSE SIGNAL (Vb)
DETECTION SIGNAL

DETECTION-SIDE PULSE SIGNAL (Va)
REFERENCE-SIDE PULSE SIGNAL (Vb)
DETECTION SIGNAL

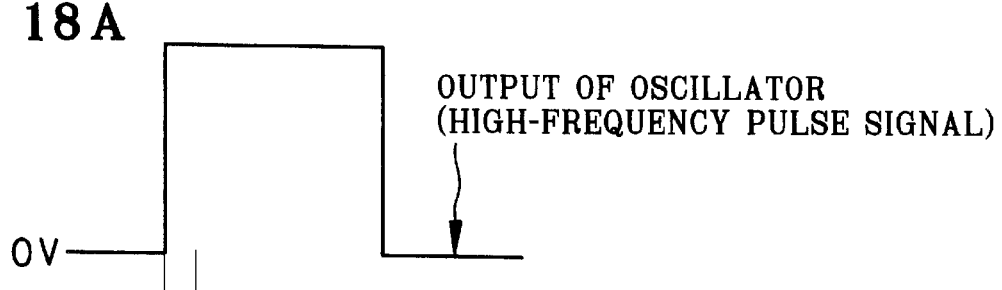
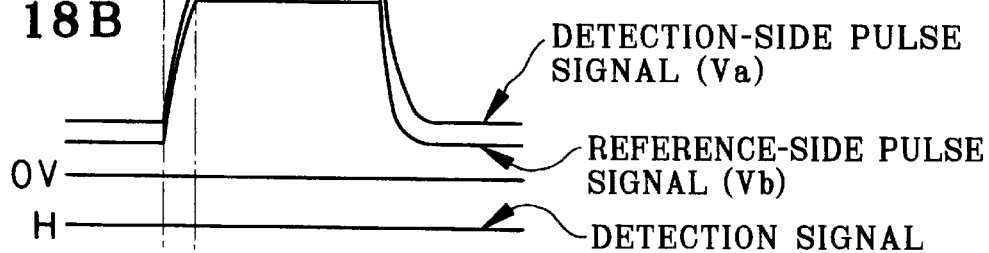
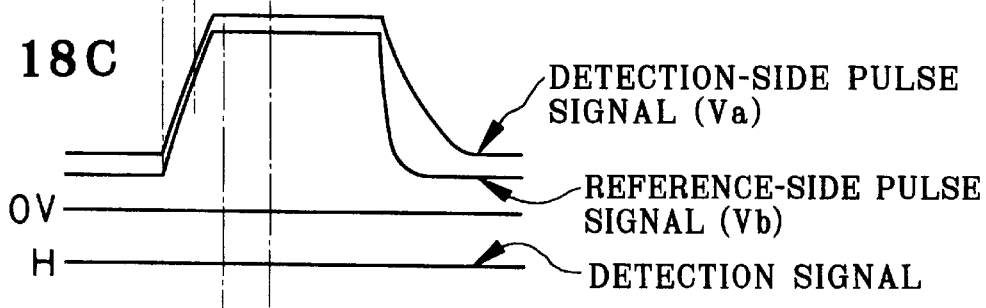
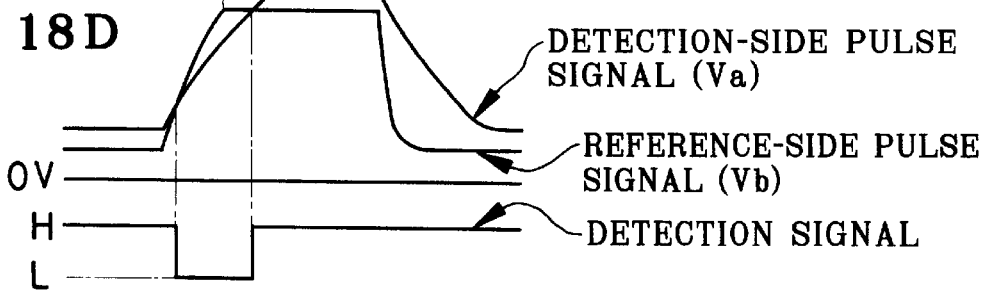

CAMERA HAVING A FINGER DETECTING DEVICE

BACKGROUND OF THE INVENTION

1. Field of the Invention

The present invention relates to a camera in which misphotographing is prevented from being caused by overlap of a finger.

2. Description of the Related Art

There is a camera provided with a lens barrel of a collapsible-mount type. In this type, the lens barrel is collapsed into a camera body at the time of non-usage, and is protruded toward the front of the camera body at the time of photographing. Such camera has a lens barrier for opening and closing a lens-barrel orifice so as to prevent dust or the like from entering the camera body through the lens-barrel orifice in a collapsible mount state.

As to a compact camera, a finger sometimes overlaps with a taking lens, a flash portion and so forth when the camera is held. Especially, with respect to a compact camera provided with a lens barrel of the collapsible-mount type and a lens barrier, there arises a problem in that a mechanism for opening and closing the lens barrier is sometimes damaged by holding the lens barrier with a finger when the lens barrier is moved. Moreover, there arises a problem in that a finger is sometimes interposed between the lens barrier and the lens-barrel orifice.

Further, a mechanism for driving the lens barrel is sometimes damaged by holding the lens barrel with a finger when the lens barrel is collapsed and protruded. In order to prevent the lens barrel from being damaged due to finger obstruction, cameras in which a driving mechanism for a lens barrel is protected are described in Japanese Patent publication Nos. 61-55099 and 7-27150, and Japanese Patent Laid-Open publication No. 7-218807. In such camera, when the lens barrel is abnormally stopped, electricity is discontinued to be supplied to a drive unit for the lens barrel, otherwise, the lens barrel is moved in a reverse direction. Meanwhile, Japanese Patent Laid-Open Publication No. 9-297336 teaches a camera in which a front end of the lens barrel is provided with a sensor for detecting a finger to prohibit a shutter releasing operation when the finger is sensed.

However, as for the cameras described in the above-noted publication Nos. 61-55099, 7-27150 and 7-218807, an operation for protection is performed after detecting a stoppage of the lens barrel so that it is impossible to prevent a strong load from being applied to the lens-barrel driving mechanism, although it is possible to prevent the strong load from being applied to the lens-barrel driving mechanism for the long duration. Incidentally, regarding the above-noted publication No. 9-297336, there is no description about a countermeasure in case the overlap of the finger occurs when the lens barrel is moved. Further, prevention against damaging the lens-barrel driving mechanism is not taken into consideration at all.

SUMMARY OF THE INVENTION

In view of the foregoing, it is a primary object of the present invention to provide a camera in which a lens barrier and a lens barrel are prevented from being damaged by overlap of a finger.

It is a second object of the present invention to provide a camera in which occurrence of mis-photographing may be reduced.

In order to achieve the above and other objects, the camera according to the present invention comprises a finger detection device for detecting a finger overlapping with a lens barrier or a lens barrel. The finger detection device includes a phase-difference detection circuit.

In a preferred embodiment, a number of the phase-difference detection circuits is two, one of which is used for the lens barrier and the other of which is used for the lens barrel. The respective phase-difference detection circuits are connected to detection electrodes to which capacitance is applied when the finger touches the lens barrier or the lens barrel.

Into the phase-difference detection circuit, two high-frequency pulse signals are inputted. One of the pulse signals is a detection-side pulse signal, and the other thereof is a reference-side pulse signal. In a normal state, a phase of the detection-side pulse signal is not delayed relative to a phase of the reference-side pulse signal.

However, when the finger touches the lens barrier or the lens barrel, the phase of the detection-side pulse signal is delayed owing to the capacitance applied to the detection electrode. Hence, the phase of the detection-side pulse signal is delayed relative to the phase of the reference-side pulse signal. Upon detecting the phase delay of the detection-side pulse signal, it is sensed that the finger overlaps with the lens barrier or the lens barrel.

In case the overlap of the finger is sensed while the lens barrier is moved or while the lens barrel is actuated, the lens barrier and the lens barrel are moved to a closed position and a collapsible-mount position respectively. Alternatively, the movement of the lens barrier and the lens barrel may be stopped. Besides these operations, a shutter releasing operation is prohibited and warning or the like is performed for a photographer.

BRIEF DESCRIPTION OF THE DRAWINGS

The above objects and advantages of the present invention will become apparent from the following detailed description of the preferred embodiments of the invention when read in conjunction with the accompanying drawings, in which:

FIG. 10 is a flow chart showing a process for detecting the finger when a power source of the camera is turned on;

FIGS. 18A through 18D are wave form charts of the phase-different detection circuit of an embodiment in which an auxiliary power source is provided;

DETAILED DESCRIPTION OF THE PREFERRED EMBODIMENT(S)

Figure 1:
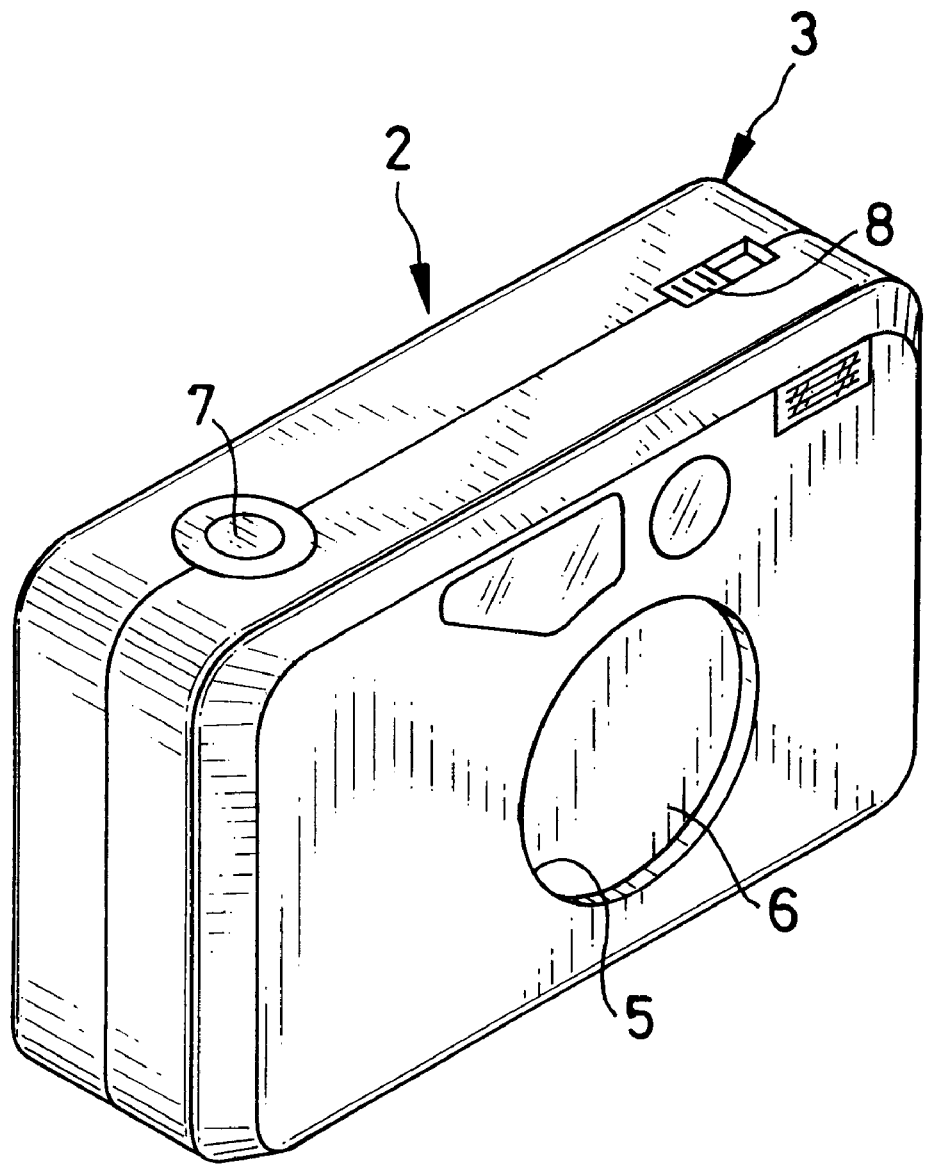
FIG. 1 is a perspective view of a camera according to the present invention in a non-usage state.

FIG. 1 is a perspective view showing a non-photographing state of a camera according to the present invention. The camera 2 comprises an exterior cover 3 and a camera body contained in the exterior cover 3. As to this camera 2, metals of aluminum, titanium, nickel alloy and so forth are used as materials of the exterior cover 3 in order to improve its high-grade feeling and its endurance.

The front of the camera 2 is provided with a circular lens-barrel orifice 5 formed in the center thereof. The inside of the lens-barrel orifice 5 is closed by a lens barrier 6 which is set at a closed position when photographing is not performed. Thus, the lens-barrel orifice 5 is protected so as to prevent dust or the like from entering the camera 2. An upper face of the camera 2 is provided with a shutter button 7 and a main switch 8. Upon half depression of the shutter button 7, focusing is performed. Upon full depression of the shutter button 7, a shutter is released. The main switch 8 turns on and off a power source of the camera 2.

Figure 2:
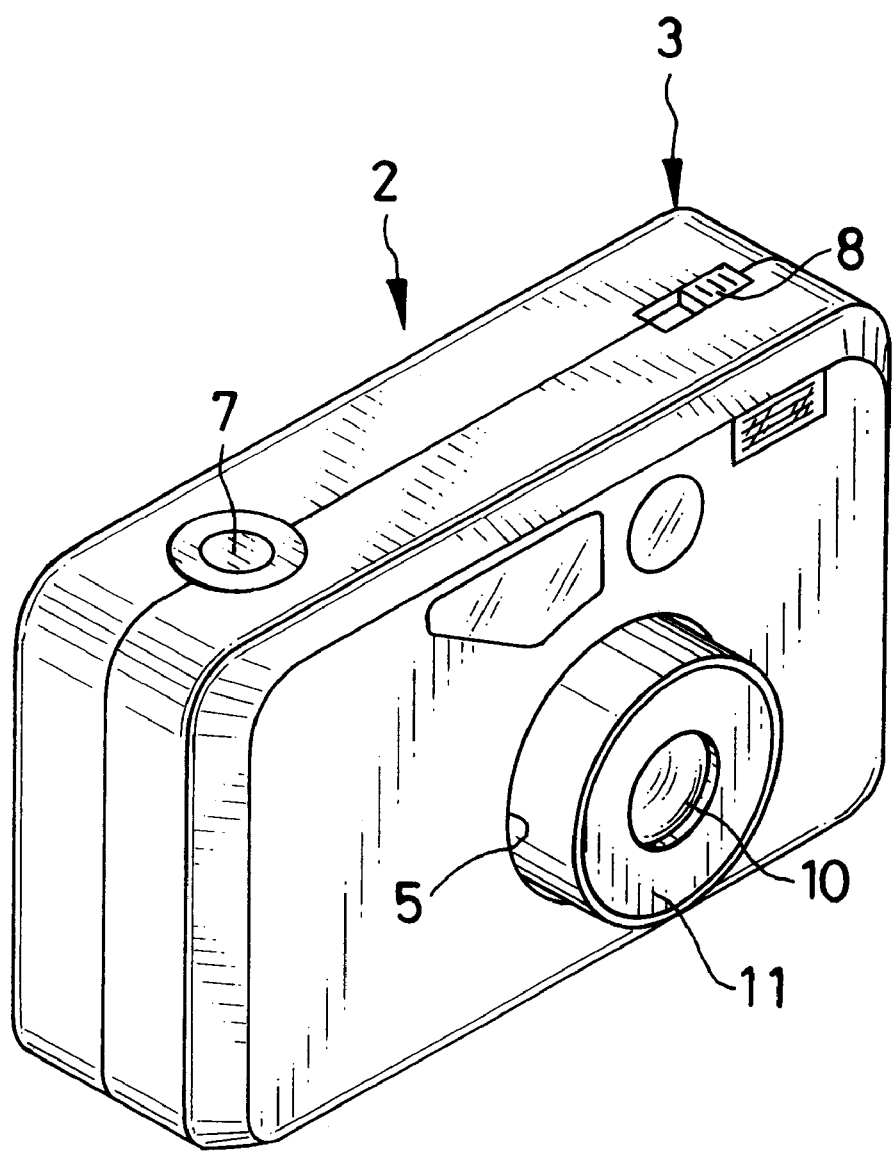
FIG. 2 is a perspective view of the camera in a usage state.

When the main switch 8 is changed to an ON-side, the power source of the camera 2 is turned on to move the lens barrier 6 to an open position. Thus, the lens-barrel orifice is opened such as shown in FIG. 2. After that, a lens barrel 11 incorporated with a taking lens 10 is protruded through the lens-barrel orifice 5 toward the front of the camera 2 to complete preparation of photographing. Inside the lens barrel 11, is incorporated a telephoto optical system including the taking lens 10. Upon manipulating a zoom switch 12 (see FIG. 4) provided on a rear face of the camera 2, a focal length of the telephoto optical system is changed.

Figure 3:
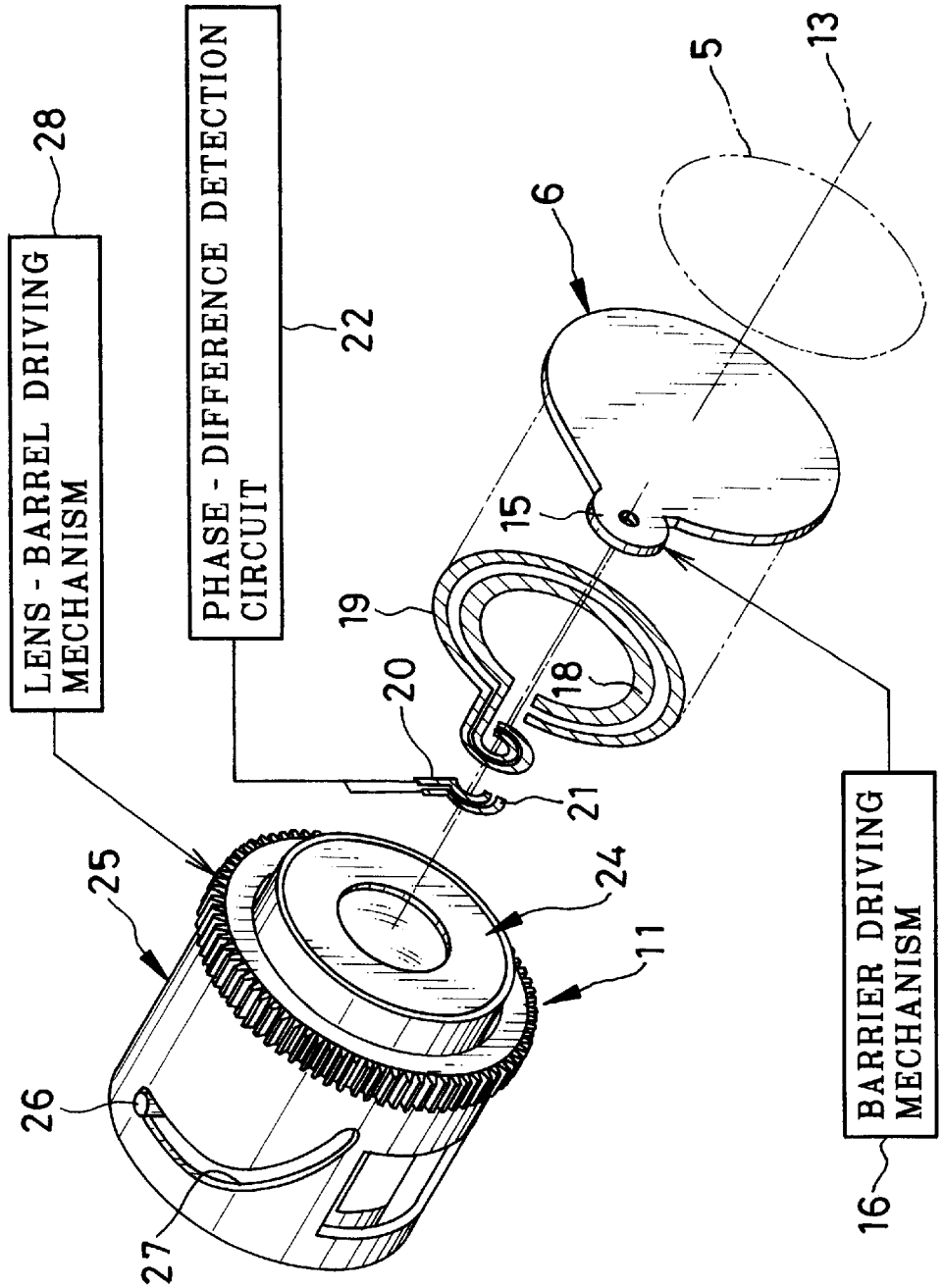
FIG. 3 is an exploded perspective view showing structure of a lens barrel and a lens barrier.

FIG. 3 is an exploded perspective view showing the lens barrier 6 and the lens barrel 11 which are disposed at a photographic optical axis 13. The lens barrier 6 has a disk-like shape and is formed from a material having isolation properties, a plastic for example. An edge of the lens barrier 6 is provided with a support portion 15 having a circular shape. The lens barrier 6 is swung around the support portion 15 to move between an open position where the lens-barrel orifice 5 is opened, and a closed position where the lens-barrel orifice 5 is closed. The lens barrier 6 is driven by a barrier electric driving mechanism 16 for electrically driving the barrier 6. The barrier electric driving mechanism 16 comprises a motor, a driver for controlling the motor, a plurality of gears rotated by the motor, and so forth.

Detection electrodes 18 and 19 used for the lens barrier 6 are attached to the back of the lens barrier 6. The detection electrodes 18 and 19 constitute a finger detection circuit 30 (see FIG. 4) for detecting a finger. The detection electrodes 18 and 19 are made of a thin metal plate and are formed so as to extend along peripheries of the support portion 15 and the lens barrier 6. The detection electrodes 18 and 19 arranged along the periphery of the support portion 15 come into contact with a pair of metal segments 20 and 21 without regard to a position of the lens barrier 6 to be electrically connected with each other. The metal segments 20 and 21 are fixed to the inside of the camera 2 and have an arc-like shape. The metal segments 20 and 21 are connected to a phase-difference detection circuit 22 constituting the finger detection circuit.

The lens barrel 11 comprises a movable barrel 24 including the taking lens 10, and a fixed barrel 25 for containing the movable barrel 24. A circumferential face of the movable barrel 24 is provided with a cam pin 26 standing therefrom. An outer face of the fixed barrel 25 is formed with a cam groove 27 for engaging with the cam pin 26. The fixed barrel 25 is for moving the lens barrel 11 and is driven by a lens-barrel electric driving mechanism 28. This lens-barrel electric driving mechanism 28 comprises a motor and a plurality of gears which are rotated by the motor and a driver for controlling the motor. When the fixed barrel 25 is rotated in a clockwise direction in FIG. 3, the cam pin 26 is moved in an optical axis direction along the cam groove 27. At the same time, the movable barrel 24 is moved in the optical axis direction toward the front.

Figure 4:
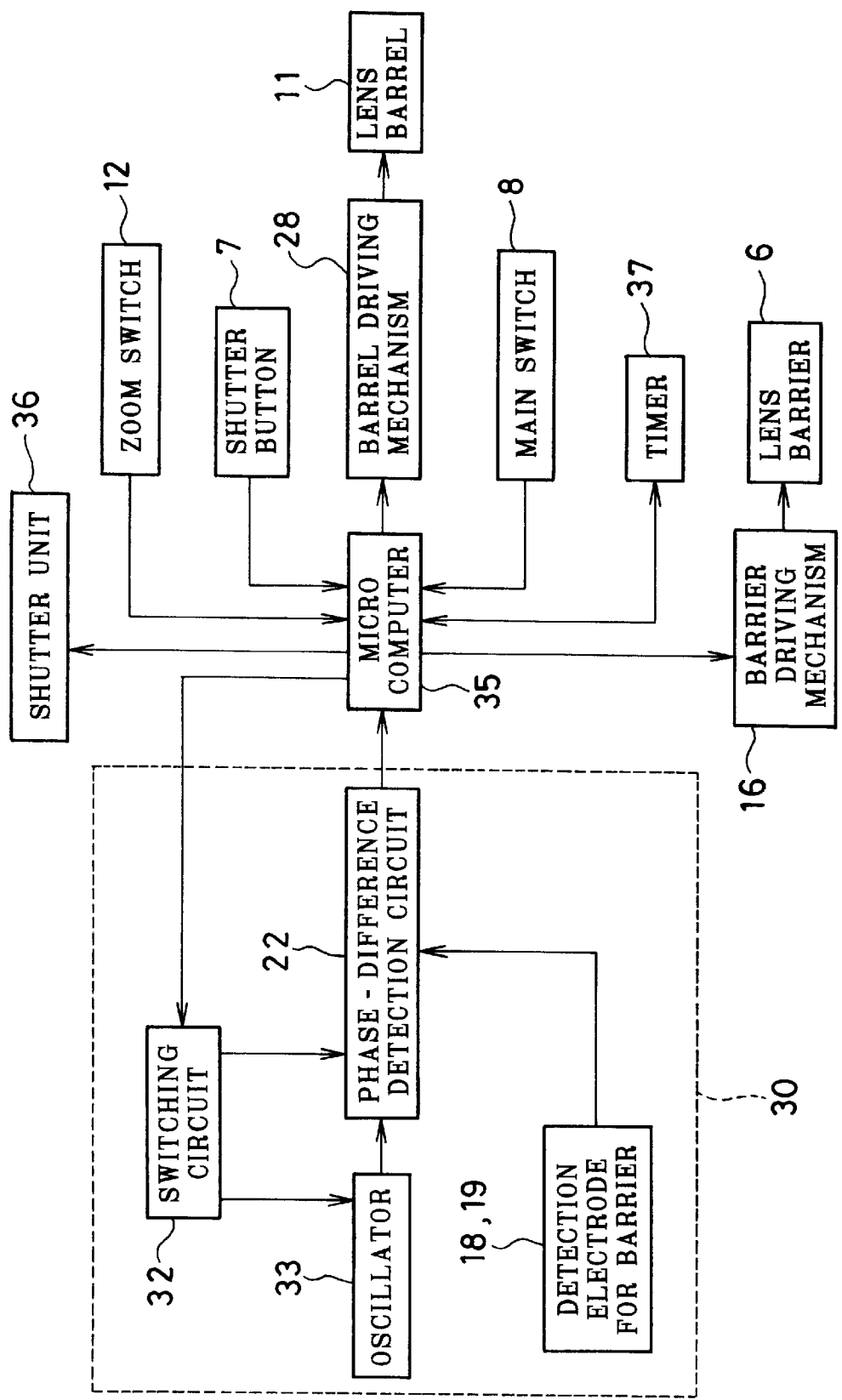
FIG. 4 is a block diagram showing electrical structure of the camera.

FIG. 4 is a block diagram showing electrical structure of the camera 2. Such as shown in FIG. 4, the finger detection circuit 30 comprises the detection electrodes 18 and 19, the phase-difference detection circuit 22, a switching circuit 32, and an oscillator 33. The finger detection circuit 30 is controlled by a micro computer 35 for controlling the respective sections of the camera 2. Operation signals from the main switch 8 and the shutter button 7 are inputted into the micro computer 35. In response to these input signals, are controlled the barrier electric driving mechanism 16, the lens-barrel electric driving mechanism 28, a shutter unit 36, and a timer 37.

When the main switch 8 is changed to the ON-side, the micro computer 35 turns on the oscillator 33 and the phase-difference detection circuit 22 via the switching circuit 32. When the oscillator 33 is turned on, the oscillator 33 generates a cyclic high-frequency pulse signal to send it to the phase-difference detection circuit 22. The phase-difference detection circuit 22 detects a phase difference of high-frequency pulses introduced from the oscillator 33. This phase difference is caused by a capacitance change of the detection electrodes 18 and 19. When the phase difference is detected, the phase-difference detection circuit 22 sends a detection signal of L level to the micro computer 35. When the phase difference is not detected, a detection signal of H level is sent to the micro computer 35.

Figure 5:
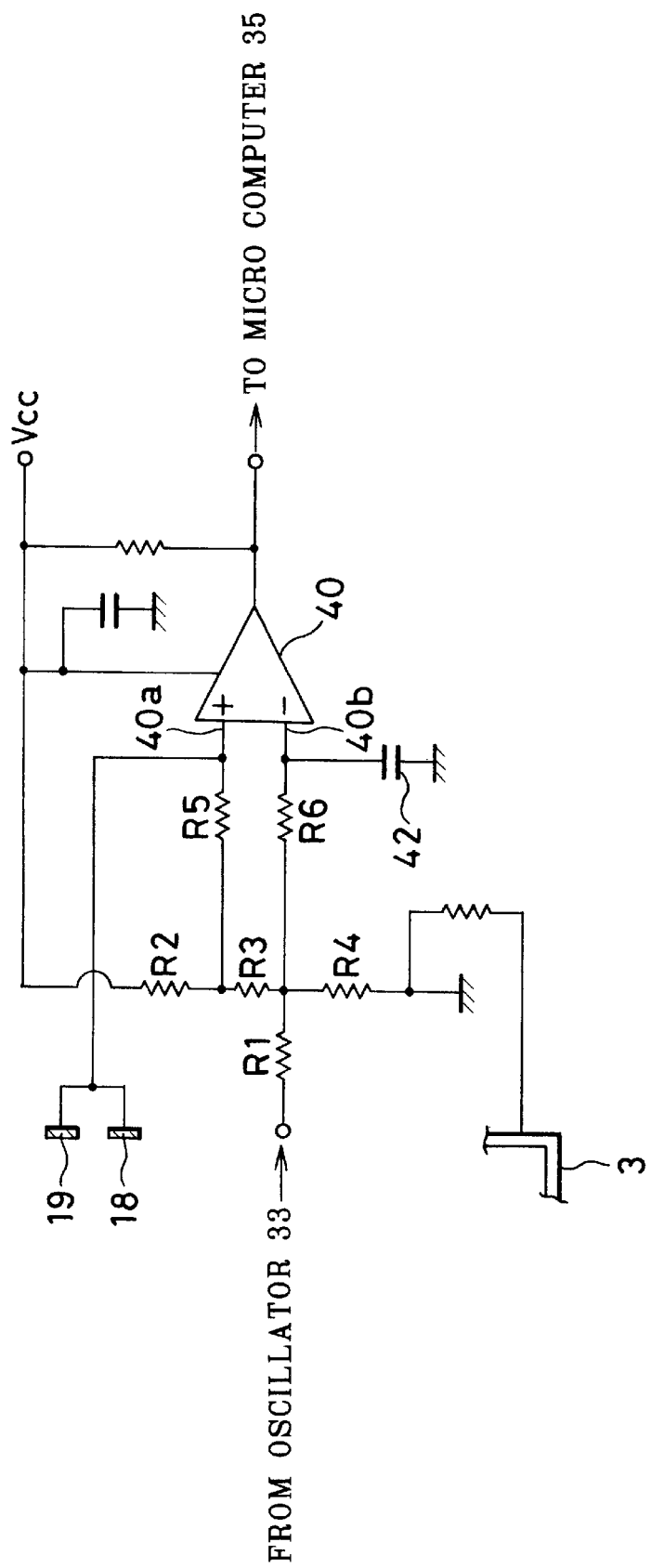
FIG. 5 is a circuit diagram of a phase-difference detection circuit.

FIG. 5 is a circuit diagram of the phase-difference detection circuit 22. The high-frequency pulse signal inputted from the oscillator 33 is divided by resistances R1 through R4 to be separated as two high-frequency pulse signals of a detection side and a reference side. The high-frequency pulse signal of the detection side is inputted into a non-inverted input terminal 40a of a comparator 40 via a resistance R5. The high-frequency pulse signal of the reference side is inputted into an inverted input terminal 40b via a resistance R6. The non-inverted input terminal 40a is connected to the detection electrodes 18 and 19 so that a CR circuit is formed by the resistance R5 and the capacitance of the detection electrodes 18 and 19. This circuit is adapted to be a delay circuit relative to the high-frequency pulse signal of the detection side (hereinafter, detection-side pulse signal).

Meanwhile, the inverted input terminal 40b is connected to a correction capacitor 42. The resistance R6 and the capacitance of the correction capacitor 42 constitute a delay circuit relative to the high-frequency pulse signal of the reference side (hereinafter, reference-side pulse signal). The capacitance of the correction capacitor 42 and a value of resistance R6 are determined such that a finger is not mistakenly sensed when a photographer holds the camera 2 properly without touching the lens barrier 6.

The exterior cover 3 having conductivity is near to the detection electrodes 18 and 19. Thus, whatever the photographer holds the camera 2 properly, the detection electrodes 18 and 19 are affected by capacitance of the photographer via the exterior cover 3 so that phase delay is caused in the detection-side pulse signal. In view of this, the phase of the reference-side pulse signal is delayed by the correction capacitor 42 and the resistance R6 so as to be identical with or slightly delayed rather than the phase delay of that time. Owing to this, while the lens barrier 6 is not touched, the detection-side pulse signal is not delayed relative to the reference-side pulse signal. Thus, it is prevented to mistakenly detect the finger.

In the phase-difference detection circuit 22, when any portion of the camera 2 is not touched, the detection-side pulse signal is adapted to precede rather than the reference-side pulse signal regarding the phase. Thus, a voltage Va of the detection-side pulse signal inputted into the non-inverted input terminal 40a is always and slightly higher than a voltage Vb of the reference-side pulse signal inputted into the inverted input terminal 40b (Va>Vb). The comparator 40 makes the detection signal H level when the voltage Va of the non-inverted input terminal 40a is higher than the voltage Vb of the inverted input terminal 40b (Va>Vb). The comparator 40 makes the detection signal L level when the voltage Va is lower than the voltage Vb (Va<Vb).

Figure 6A:
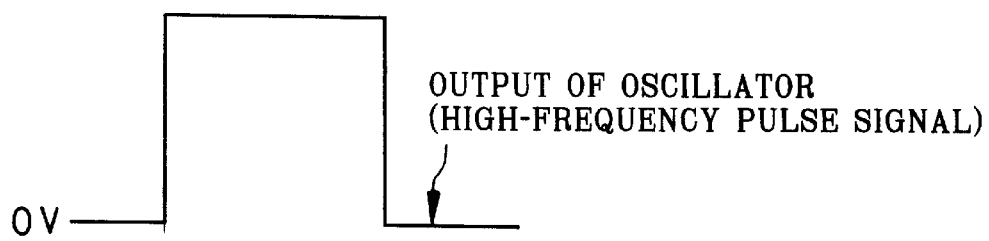
FIGS. 6A through 6D are wave form charts of the phase-difference detection circuit.

The finger detection circuit 30 is operated such as described below. Upon turning on the main switch 8, the oscillator 33 outputs the high-frequency pulse signal having a right edge, such as shown in FIG. 6A. As mentioned above, this high-frequency pulse signal is inputted into the non-inverted input terminal 40a via the resistance R5, and is inputted into the inverted input terminal 40b via the resistance R6.

Figure 6B:
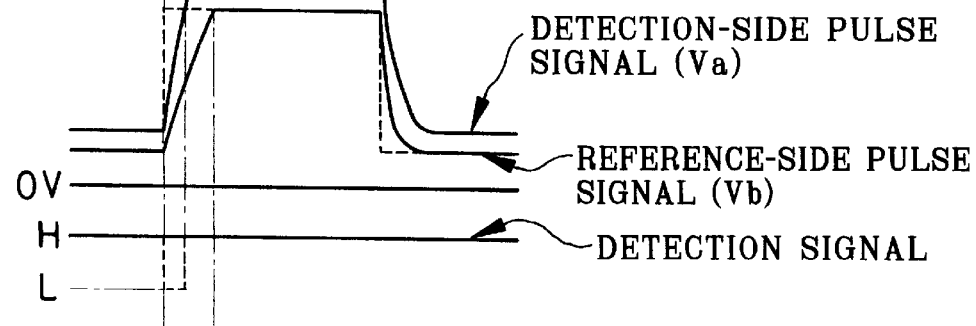

For example, when the camera 2 is settled on a tripod or the like and the exterior cover 3 is not touched, wave forms of the high-frequency pulse signals inputted into both of the input terminals 40a and 40b (or, changes of the voltages Va and Vb) have dull rising edges such as shown in FIG. 6B. The phase of each of the high-frequency pulse signals is delayed relative to the output of the oscillator 33 before reaching its peak voltage.

With respect to the detection-side pulse signal, the delay circuit is constituted of the resistance R5 and the capacitance of the detection electrodes 18 and 19 so that the rising edge of the pulse signal becomes dull. Meanwhile, with respect to the reference-side pulse signal, the rising edge thereof becomes dull due to the delay circuit which is constituted of the correction capacitor 42 and the resistance R6. The phase of the reference-side pulse signal before its peak voltage is delayed by the delay circuit of the correction capacitor 42 and the resistance R6, relative to the phase of the detection-side pulse signal before its peak voltage. Thus, the voltage Va of the detection-side pulse signal and the voltage Vb of the reference-side pulse signal are kept in a relationship of Va>Vb. Hence, the prescribed phase difference is not detected so that overlap of the finger is not sensed.

Figure 6C:
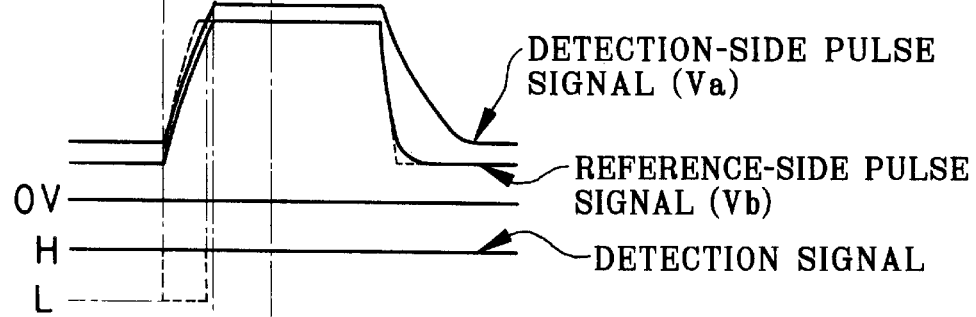
Figure 7:
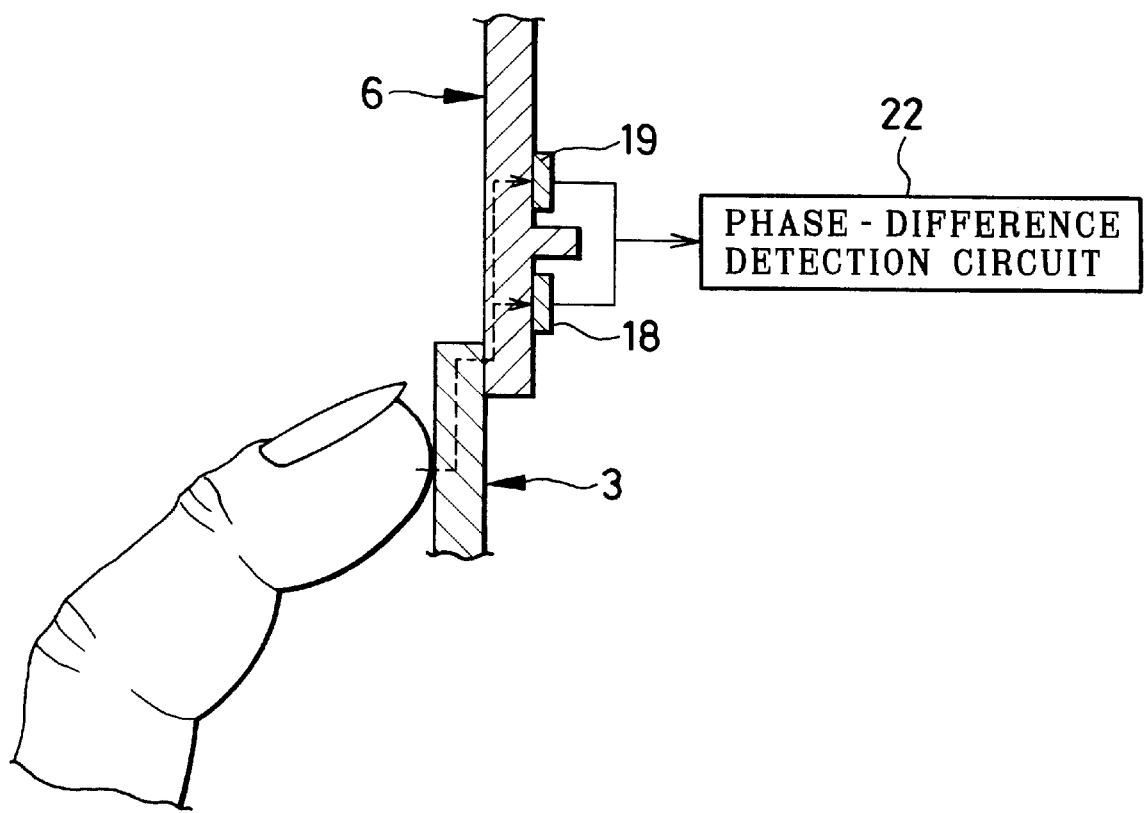
FIG. 7 is a partially sectional view showing a state in that capacitance is applied to the camera.

Under a condition that a photographer holds the camera 2 without touching the lens barrier 6, such as shown in FIG. 7, capacitance of the photographer is applied to the detection electrodes 18 and 19 via the conductive exterior cover 3 and the lens barrier 6. Consequently, the rising edge of the detection-side pulse signal becomes duller than the state shown in FIG. 6B so that the phase before the peak voltage is further delayed. The phase of the reference-side pulse signal before its peak voltage is identical with that in FIG. 6B and is similar or slightly delayed relative to the phase of the detection-side pulse signal before its peak voltage. Accordingly, the respective voltages Va and Vb are kept in the relationship of Va>Vb as shown in FIG. 6C so that warning for the overlap of the finger is not performed.

In case the correction capacitor 42 is not provided, the phase of the reference-side pulse signal is not delayed under a condition that the exterior cover 3 is not touched, such as shown by a broken line in FIG. 6B. Thus, the relationship between the voltage Va of the detection-side pulse signal and the voltage Vb of the reference-side pulse signal becomes Va<Vb at the pulse rising. Hence, the detection signal from the comparator 40 is changed from the H level to the L level so that the overlap of the finger is mistakenly sensed.

Moreover, it is insufficient to merely correct the capacitance of the correction capacitor 42 and the value of resistance R6, only taking account of the delay of the detection-side pulse signal under a condition that the camera 2 is not held. When the camera 2 is held without the overlap of the finger, the phase of the peak voltage of the reference-side pulse signal is not delayed relative to the phase of the peak voltage of the detection-side pulse signal, such as shown by a broken line in FIG. 6C. Thus, similarly to the above case in that the correction capacitor 42 is not provided, the relationship between the voltages Va and Vb becomes Va<Vb so that the overlap of the finger is mistakenly sensed.

Figure 6D:
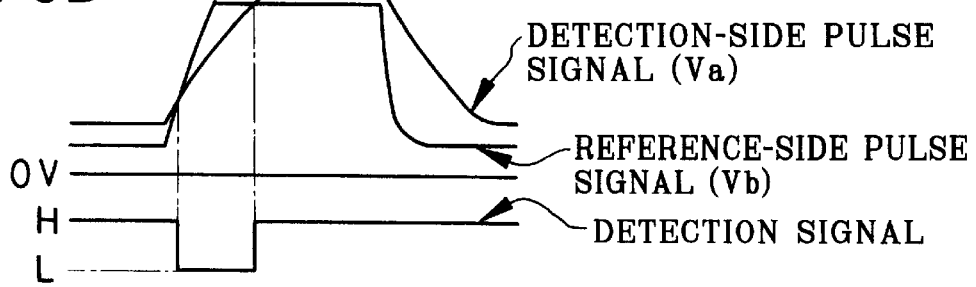
Figure 8:
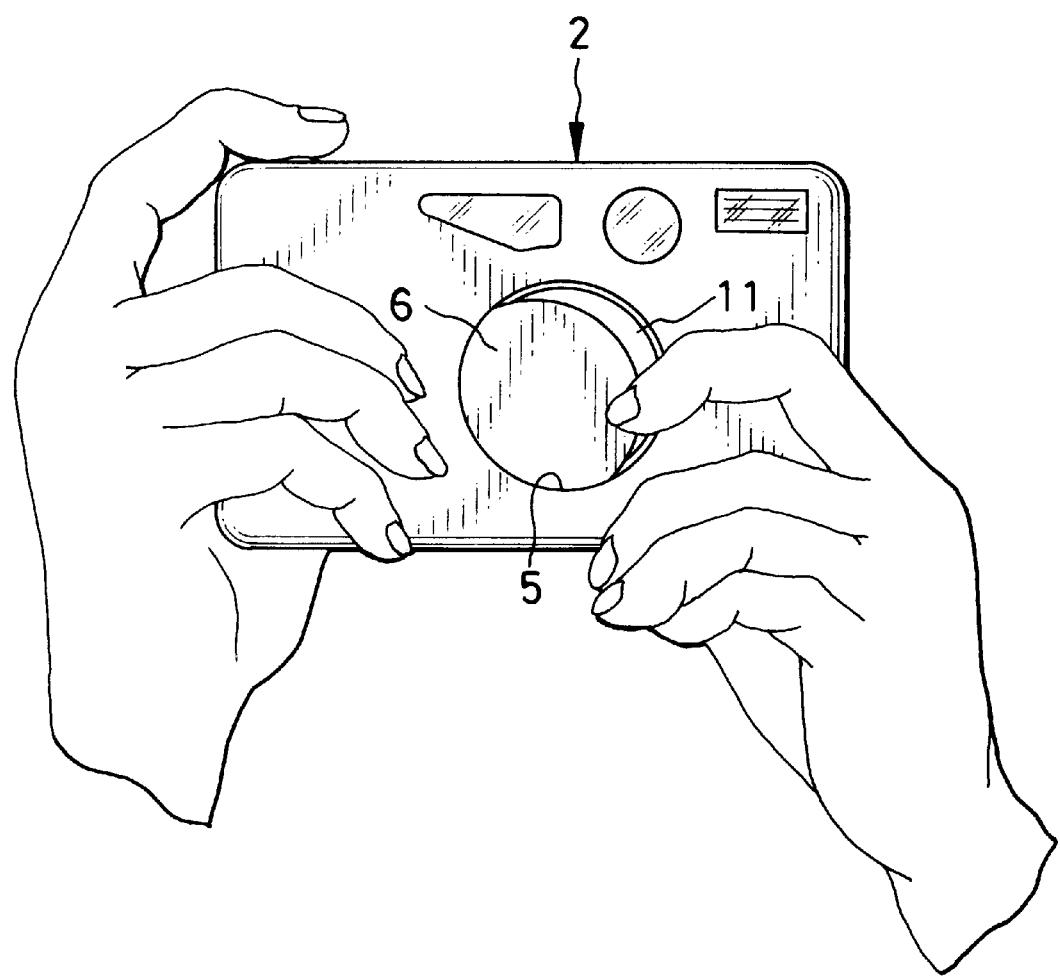
FIG. 8 is a front view showing a state in that a finger overlaps with the lens barrier.
Figure 9:
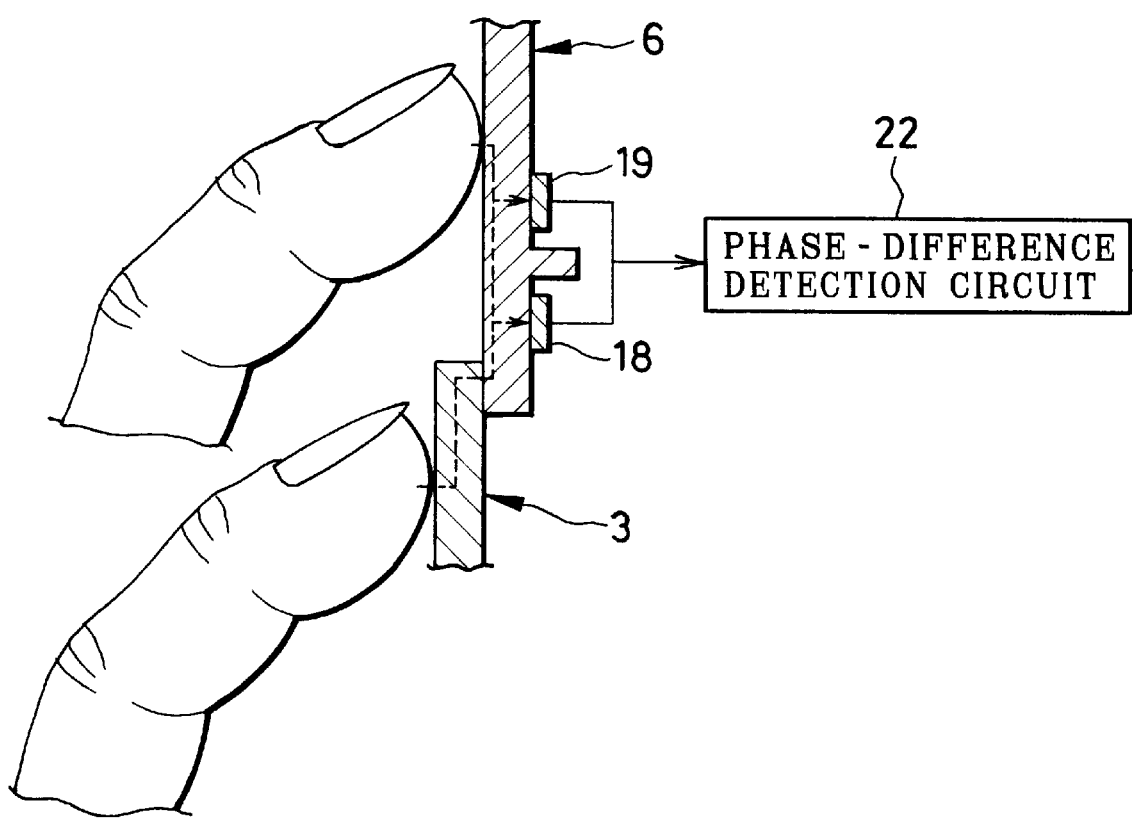
FIG. 9 is a partially sectional view showing a state in that the finger overlaps with the lens barrier.

When the photographer holds the camera 2 in a state that the lens barrier 6 is touched such as shown in FIG. 8, the capacitance of the photographer is applied to the detection electrodes 18 and 19 through both routes, as shown in FIG. 9, one of which is constituted of the photographer and the lens barrier 6, and the other of which is constituted of the photographer, the exterior cover 3 and the lens barrier 6. Thus, as shown in FIG. 6D, the rising edge of the detection-side pulse signal becomes duller than that in FIG. 6C so that the detection-side pulse signal is duller than the reference-side pulse signal. Hence, the relationship between the voltage Va of the detection-side pulse signal and the voltage Vb of the reference-side pulse signal becomes Va<Vb at the time of pulse rising so that the detection signal from the comparator 40 is changed from the H level to the L level. In this way, the phase delay of the detection-side pulse signal before the peak voltage is detected and the overlap of the finger is sensed.

Figure 10:
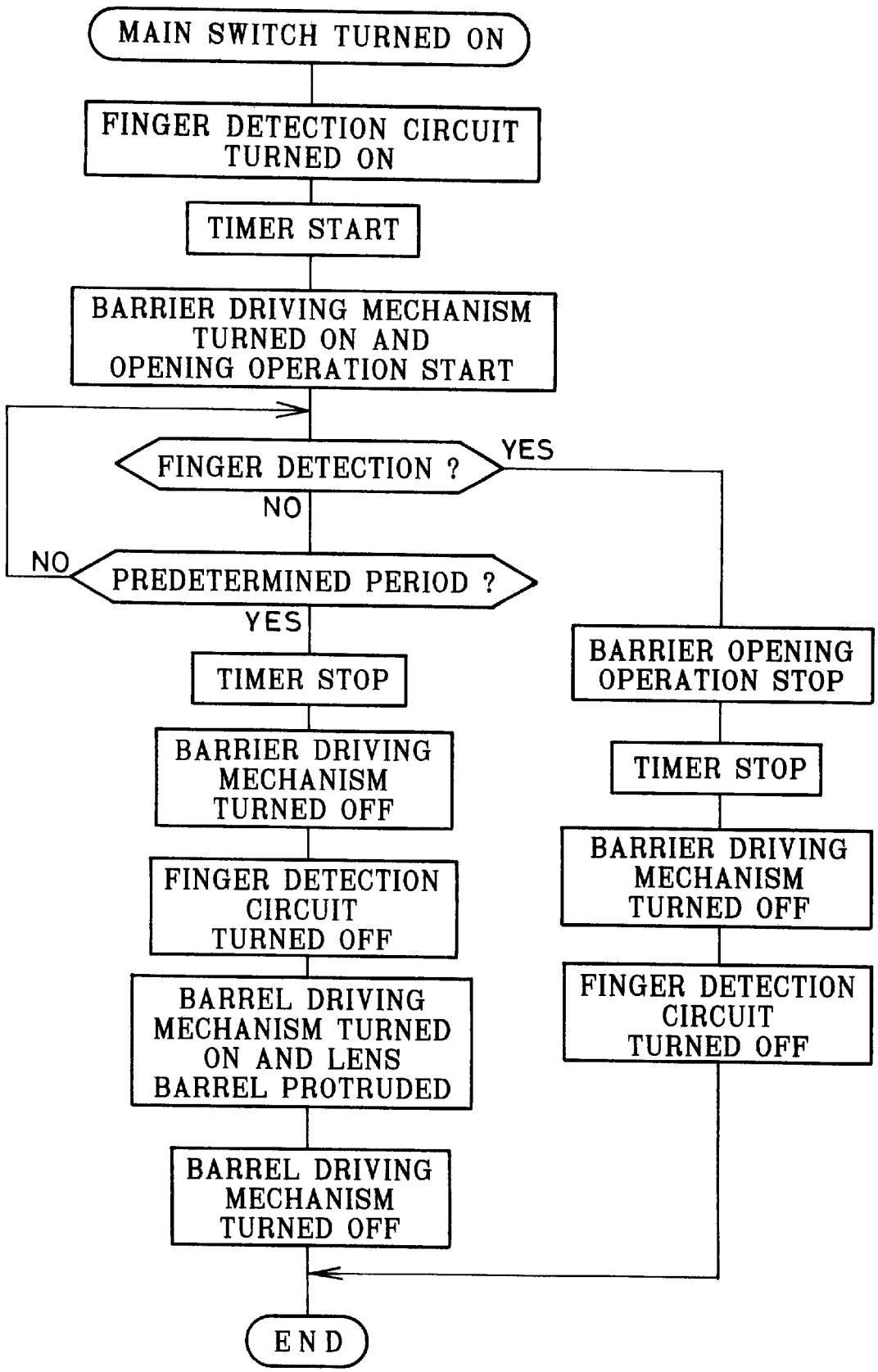
Figure 11:
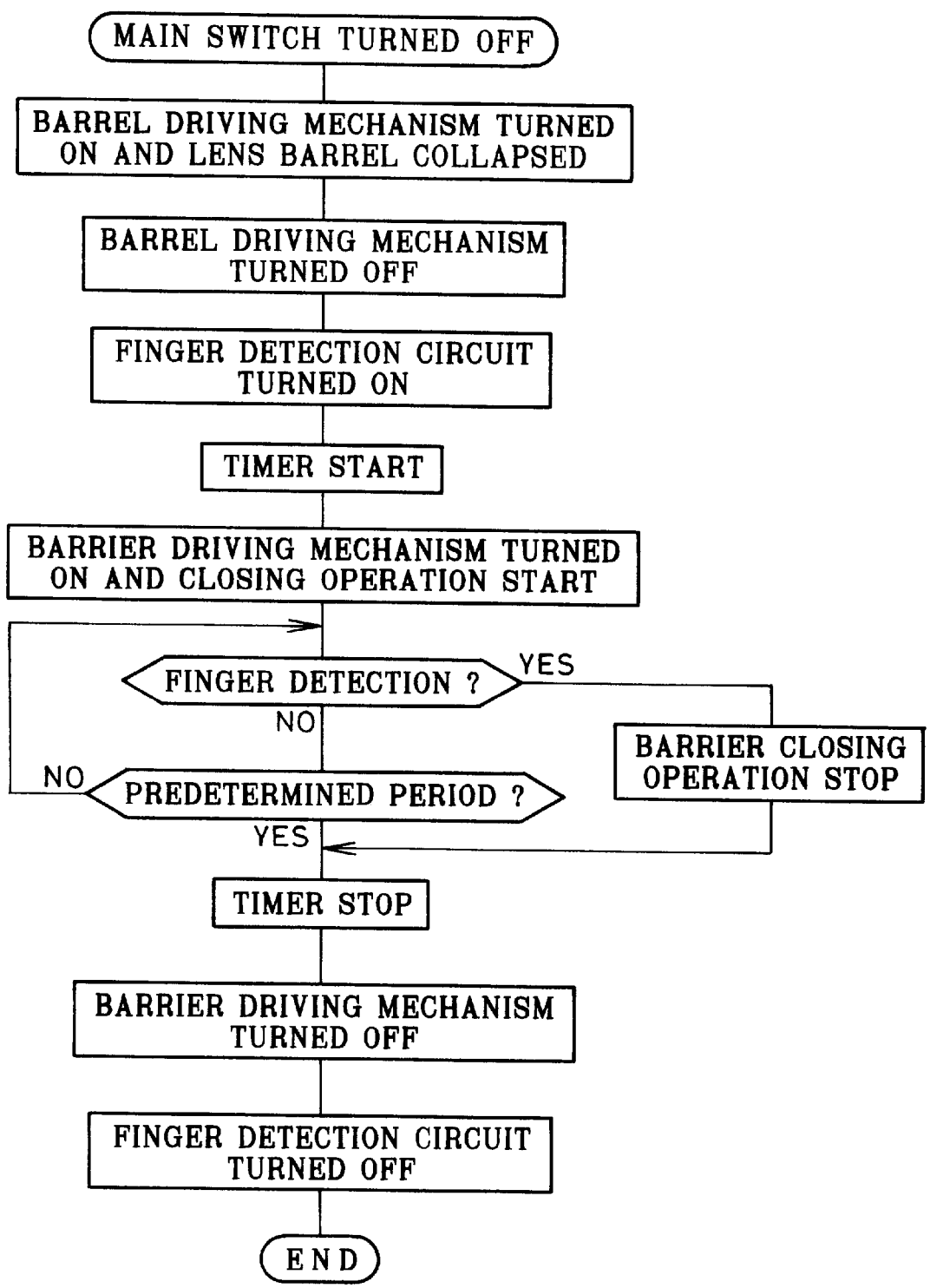
FIG. 11 is a flow chart showing a process for detecting the finger when the power source of the camera is turned off.

Next, an operation of the above embodiment is described below, referring to flow charts shown in FIGS. 10 and 11. When the camera 2 is not used, the lens barrel 11 is collapsed in the camera 2 and the lens-barrel orifice 5 is closed by the lens barrier 6.

Upon turning on the main switch 8, the micro computer 35 activates the finger detection circuit 30 and starts the operation of the timer 37. The timer 37 counts a period during which the lens barrier 6 is moved from a closed position to an open position. Alternatively, the timer 37 may count a period which is slightly longer than the above-noted period. After counting has been completed, a completion signal is inputted into the micro computer 35.

In the finger detection circuit 30, the oscillator 33 outputs the high-frequency pulse signal shown in FIG. 6A. This pulse signal is inputted into the non-inverted input terminal 40a via the resistance R5 as the detection-side pulse signal. Further, the pulse signal from the oscillator 33 is inputted into the inverted input terminal 40b via the resistance R6 as the reference-side pulse signal. Moreover, the micro computer 35 actuates the barrier electric driving mechanism 16 to move the lens barrier 6 toward the open position.

When the photographer holds the camera without touching the lens barrier 6 such as shown in FIG. 7 during the opening movement of the lens barrier 6, the voltage Va of the detection-side pulse signal and the voltage Vb of the reference-side pulse signal are kept in the relationship of Va>Vb. Thus, the prescribed phase difference is not detected so that the overlap of the finger is not sensed. After the timer 37 has counted the predetermined period, the timer 37 is stopped. Then, the barrier electric driving mechanism 16 and the finger detection circuit 30 are turned off.

After the lens barrier 6 has been moved to the open position, the lens-barrel deriving mechanism 28 is actuated to protrude the lens barrel 11 toward the front of the camera 2. When the lens barrel 11 is completely protruded, the lens-barrel electric driving mechanism 28 is turned off and preparation of the camera 2 for photographing is over.

In case the finger of the photographer touches the lens barrier 6 such as shown in FIGS. 8 and 9 during the opening movement of the lens barrier 6, the relationship between the voltages Va and Vb becomes Va<Vb such as shown in FIG. 6D. In accordance with this, the detection signal from the comparator 40 changes from the H level to the L level. Thus, the overlap of the finger is sensed from the phase delay caused before reaching the peak voltage of the detection-side pulse signal.

When the finger overlapping with the lens barrier 6 is sensed, the micro computer 35 stops the opening movement of the lens barrier 6. In virtue of this, it is possible to prevent the lens barrier 6 from being damaged by a load. Further, the timer 37 is stopped, the barrier electric driving mechanism 16 and the finger detection circuit 30 are turned off, and the whole operation of the camera 2 is stopped. When the camera 2 having been set in a non-operation state is returned to a photographable condition, the main switch 8 is once turned off, and then, is turned on again for example. In response to such handling, the lens barrier 6 is opened again and the lens barrel 11 is protruded to complete the preparation for photographing.

After the preparation of the camera 2 for photographing has been over, framing is performed, watching through a viewfinder. Upon depression of the shutter button 7, the shutter unit 36 is released to take a picture. After photographing, an exposed frame is automatically wound up to set an unexposed frame to an exposure position. When taking a picture is suspended, the main switch 8 of the camera 2 is turned off.

Upon turning off the main switch, the lens-barrel electric driving mechanism 28 is actuated to collapse the lens barrel 11 in the camera 2. After collapsing the lens barrel 11, are activated the finger detection circuit 30, the timer 37 and the barrier electric driving mechanism 16 to move the lens barrier 6 from the open position to the closed position.

When the finger of the photographer does not touch the lens barrier 6 during the movement of the lens barrier toward the closed position, the voltage Va of the detection-side pulse signal and the voltage Vb of the reference-side pulse signal are kept in the relationship of Va>Vb, such as shown in FIG. 6C. Thus, the prescribed phase difference is not detected so that the overlap of the finger is not sensed. After that, when counting a fixed period by the timer 37 is over, the barrier electric driving mechanism 16 and the finger detection circuit 30 are turned off.

On the other hand, when the finger of the photographer touches the lens barrier 6 during the movement of the lens barrier 6 toward the closed position, the relationship between the voltages Va and Vb becomes Va<Vb, such as shown in FIG. 6D, so that the detection signal from the comparator 40 changes from the H level to the L level. Thus, the overlap of the finger is detected based on the phase delay of the detection-side pulse signal before the peak voltage.

When the finger overlapping with the lens barrier 6 is sensed, the micro computer 35 stops the movement of the lens barrier 6 toward the closed position. In virtue of this, it is possible to prevent the lens barrier 6 from being damaged by a load. Moreover, it is possible to prevent the finger from being interposed between the lens barrier 6 and the lens-barrel orifice 5. At this time, the barrier electric driving mechanism 16 and the finger detection circuit 30 are turned off to stop the whole operation of the camera 2. For returning the camera 2 whose operation has been stopped, the main switch 8 may be turned on and off such as described above.

In the above embodiment, the movement of the lens barrier 6 is stopped when the finger overlaps with the lens barrier 6. However, the lens barrier 6 may be moved to the open position at the time of overlapping to prevent the finger from being caught with the lens barrier 6. Moreover, in the above embodiment, the finger detection circuit 30 is activated for the fixed period when the main switch 8 is turned on and off. However, the finger detection circuit 30 may be activated only when the main switch is turned on, or only when turned off. Further, in the above embodiment, the fixed period for activating the finger detection circuit 30 is determined by the timer 37. However, the finger detection circuit 30 may be activated while the lens barrier 6 is moved between the open position and the closed position. Otherwise, the finger detection circuit 30 may be activated while the barrier electric driving mechanism 16 is actuated.

Figure 12:
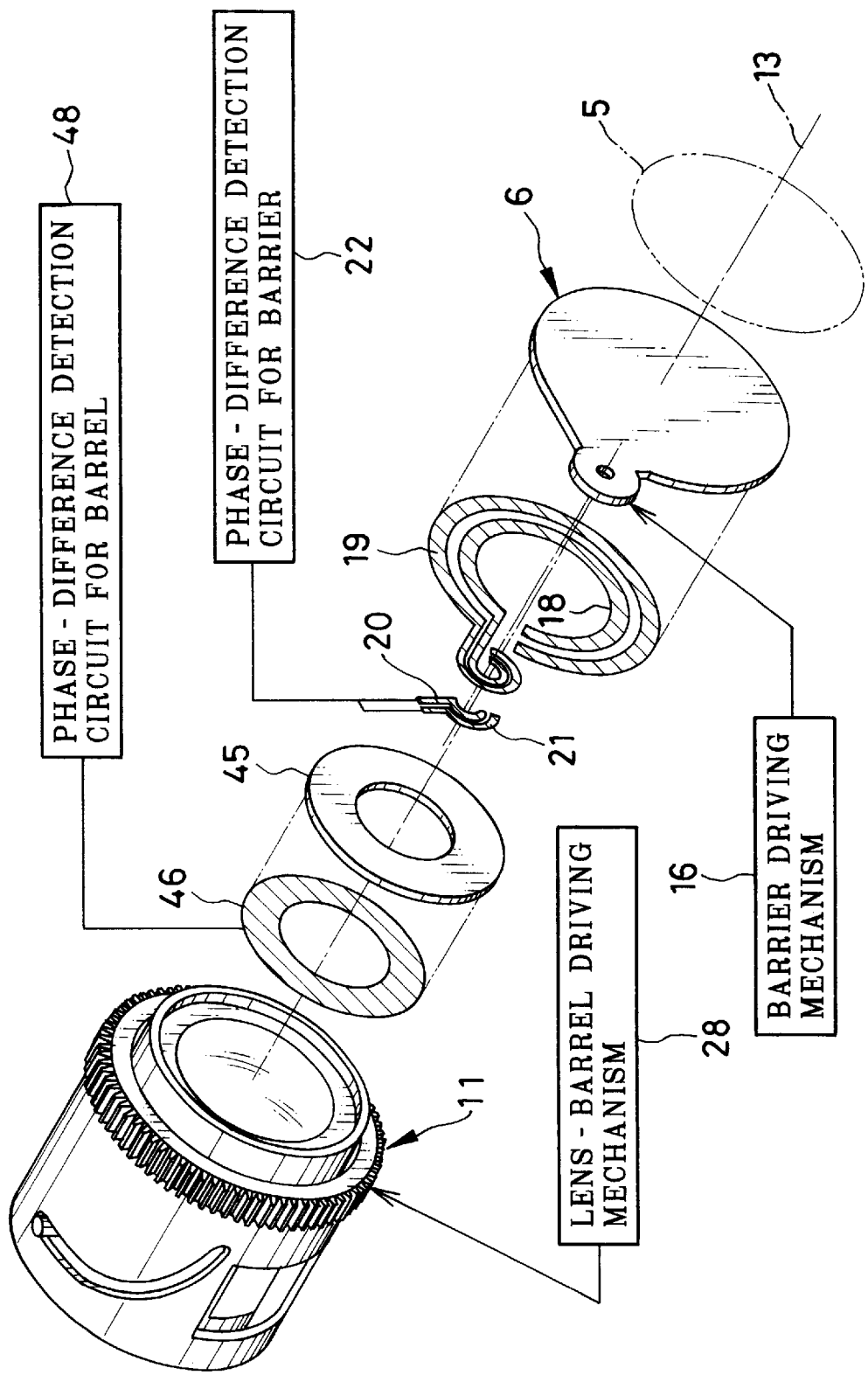
FIG. 12 is an exploded perspective view showing structure of the lens barrel and the lens barrier according to a second embodiment.
Figure 13:
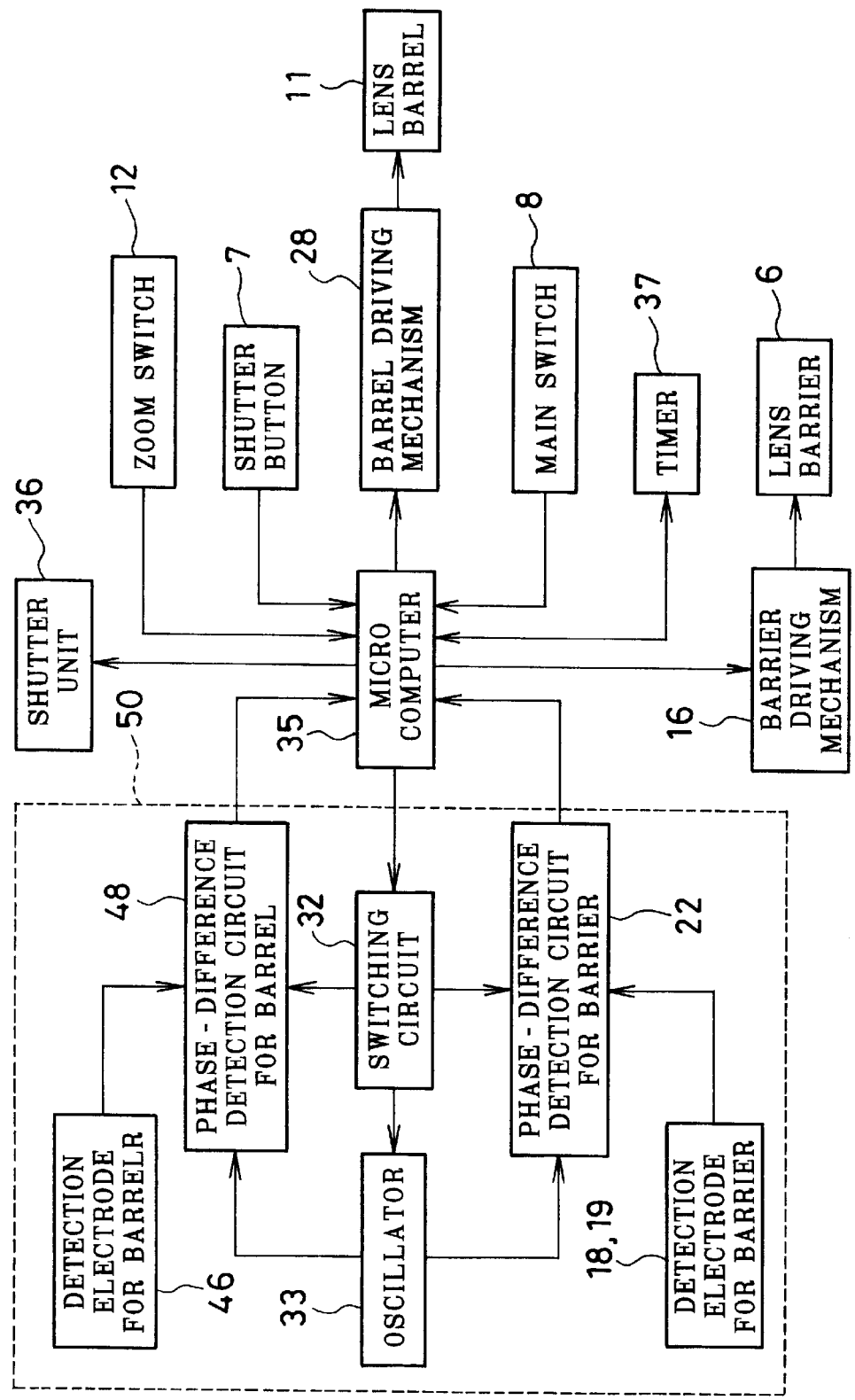
FIG. 13 is a block diagram showing electrical structure of the camera according to the second embodiment.

By the way, such as shown in FIG. 12, a detection electrode 46 used for the lens barrel 11 may be attached to the back of a decorative sheet 45. Also in this way, it is possible to detect a finger overlapping with the lens barrel 11. In this case, the detection electrode 46 is made of a thin metal plate so as to have a doughnut-like shape. The detection electrode 46 is connected to a phase-difference detection circuit 48 used for the lens barrel 11, such as shown in a block diagram in FIG. 13. Incidentally, the detection electrodes 18 and 19 used for the lens barrier 6 are connected to the phase-difference detection circuit 22 of the lens barrier 6.

According to a finger detection circuit 50 of the present embodiment, a finger overlapping with the lens barrier 6 is detected by the phase-difference detection circuit 22 when the lens barrier 6 is opened and closed. Further, a finger overlapping with the lens barrel 11 is detected by the phase-difference detection circuit 48 when the lens barrel 11 is collapsed and protruded. In case the overlap of the finger occurs when the lens barrel 11 is collapsed and protruded, a collapsing operation and a protruding operation are stopped similarly to the case of the lens barrier 6. Otherwise, the lens barrel 11 may be compulsorily moved to a collapsible mount position or to a protrusion position. In this way, the lens barrel 11 and the lens-barrel electric driving mechanism 28 are prevented from being damaged.

The lens barrel 11 is collapsed and protruded not only when the main switch 8 is turned on and off, but also when the zooming and the shutter release are performed. Thus, the finger overlapping with the lens barrel 11 is also sensed at both time of a zooming operation and a shutter releasing operation. The following description relates to finger detection at the time of the zooming operation and the shutter releasing operation. Moreover, an example of a process for detecting the finger is described.

Figure 14:
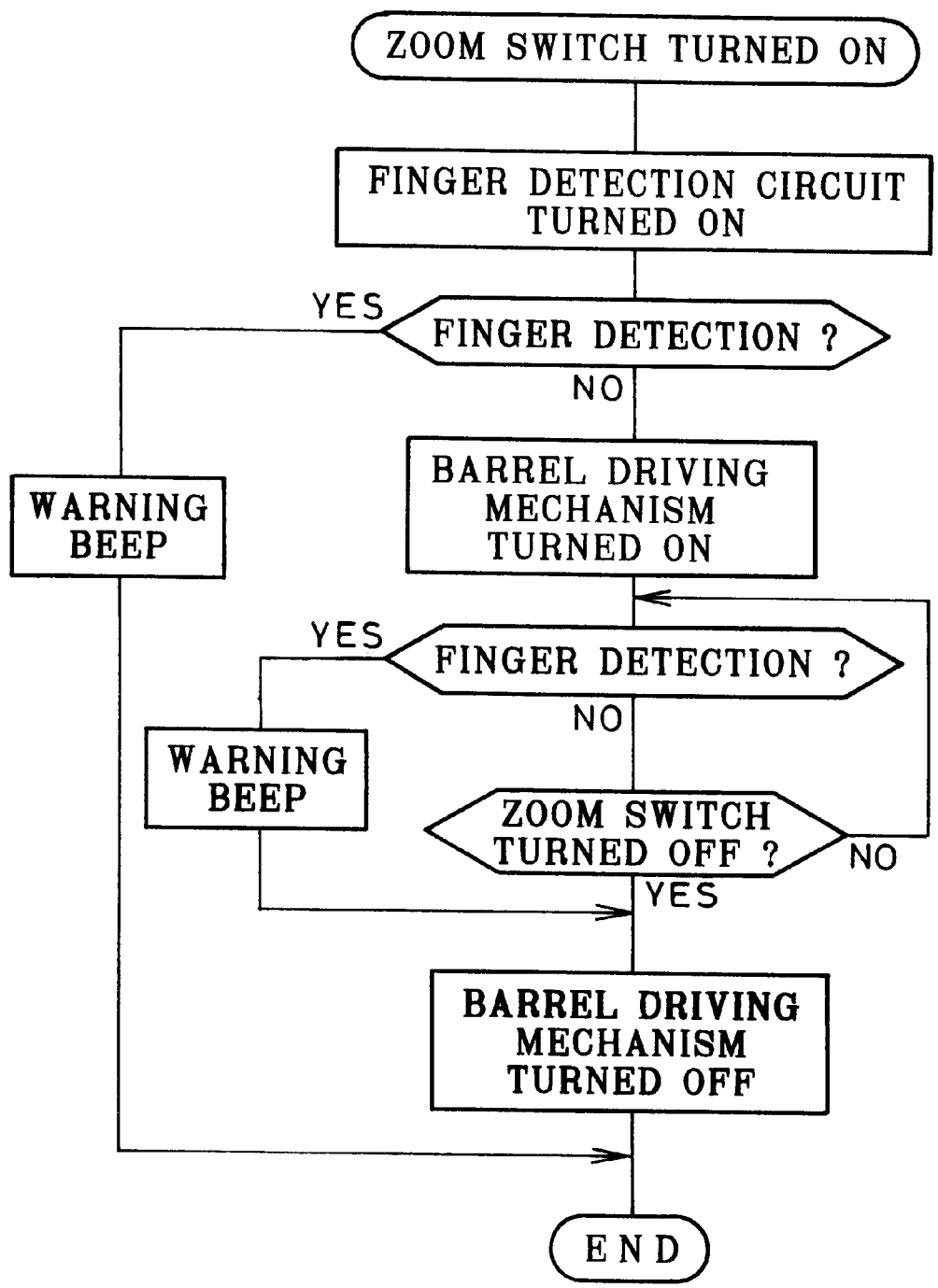
FIG. 14 is a flow chart showing a process for detecting the finger at the time of zooming.

A flow chart in FIG. 14 shows a finger detecting process performed at the time of the zoom operation. This process is started in association with handling of the zoom switch 12 provided at the rear face of the camera. When the zoom switch 12 is moved to a telephoto side or a wide-angle side, a corresponding operation signal is inputted into the micro computer 35. The micro computer 35 turns on the finger detection circuit 50 before protruding the lens barrel 11 to detect the finger overlapping with the lens barrel 11. When the finger overlapping with the lens barrel 11 is detected, a warning beep is generated from a buzzer for cautioning a photographer about the overlap of the finger. In this case, the lens barrel 11 is not moved any more.

When the overlap of the finger is not detected before moving the lens barrel 11, the micro computer 35 controls the lens-barrel electric driving mechanism 28 to move the lens barrel 11. The finger detection circuit 50 continues to detect the overlap of the finger during the movement of the lens barrel 11. Upon detecting the overlap of the finger, warning is given with the beep and the lens-barrel electric driving mechanism 28 is controlled to stop the movement of the lens barrel 11. For resuming the zooming operation, the zoom switch 12 is once stopped to be operated, and then, the finger is separated from the lens barrel 11. The zooming operation can be carried out by handling the zoom switch 12 again.

Figure 15:
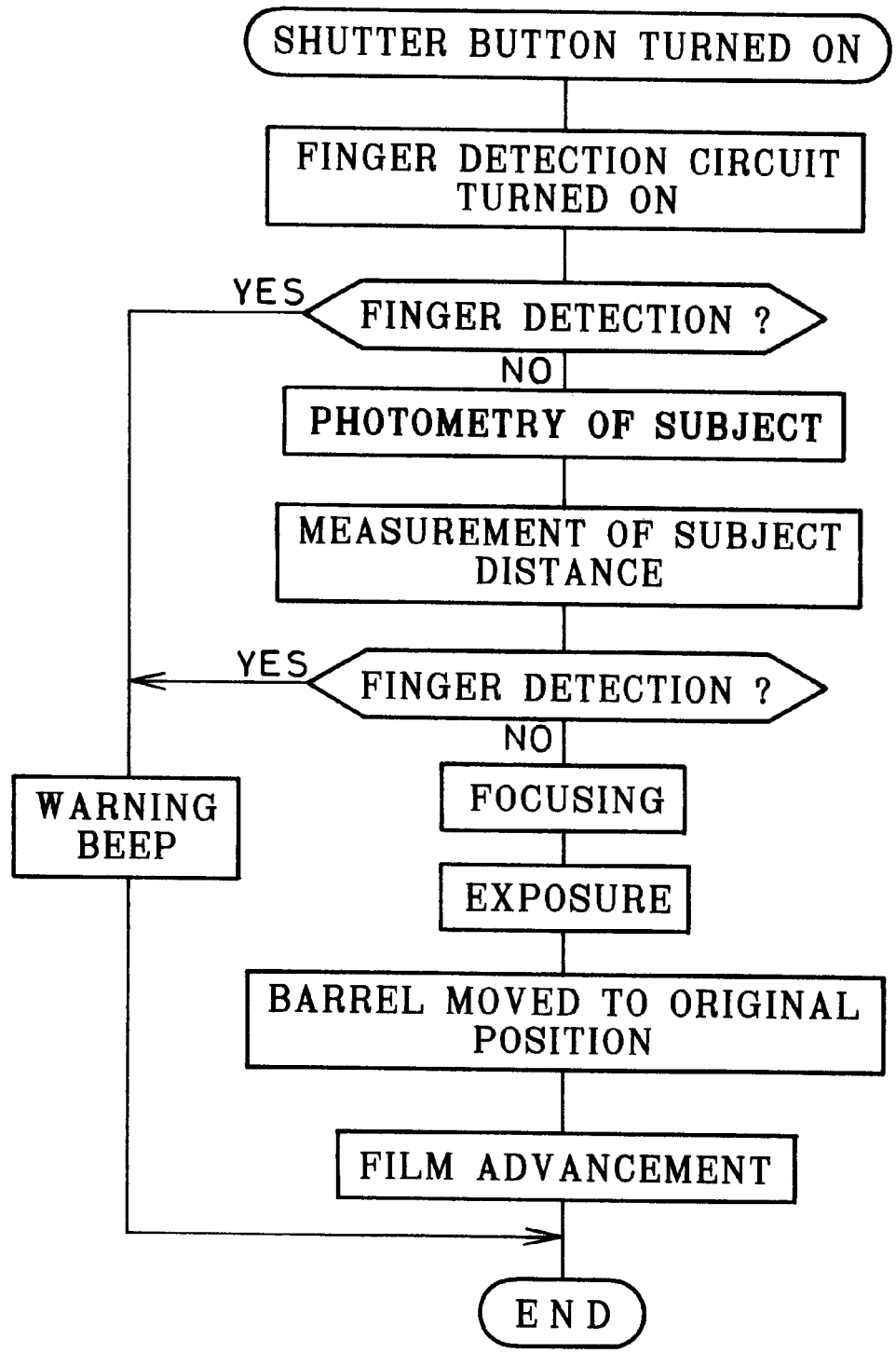
FIG. 15 is a flow chart showing a process for detecting the finger at the time of shutter releasing.

A flow chart in FIG. 15 shows a finger detecting process performed at the time of the shutter releasing operation. This process is started in association with handling of the shutter button 7 provided at the upper face of the camera. Upon depression of the shutter button 7, an operation signal is inputted into the micro computer 35. The micro computer 35 turns on the finger detection circuit 50 to detect a finger overlapping with the lens barrel 11. In case the finger overlapping with the lens barrel 11 is detected, a warning beep is generated from the buzzer for cautioning the photographer about the overlap of the finger. In this case, the shutter releasing operation is not carried out any more. In virtue of this, it is prevented to photograph the finger when a picture is taken.

When the overlap of the finger is not detected, the micro computer 35 drives a photometry element and a distance measurement element, which are incorporated in the camera, to perform photometry of a subject and to measure a subject distance. Then, the lens barrel 11 is moved in accordance with a measured value. Incidentally, detection of the finger overlapping with the lens barrel 11 is performed again before focusing. In case the overlap of the finger is detected, a warning beep is generated from the buzzer for cautioning the photographer about the overlap of the finger. In this case, the shutter releasing operation is not carried out any more. Thus, it is prevented that out of focus and photographing a finger are caused by the lens barrel 11 mistakenly actuated due to a load of the finger.

When focusing is over in a state that the overlap of the finger does not occur, the micro computer 35 actuates the shutter unit 36 to perform exposure so that the subject is photographed on a frame of a photo film. After exposing the frame, the micro computer 35 returns the lens barrel 11 from a focusing position to an original position. After that, the exposed frame is wound up to complete the photograph of one frame.

As to the warning given when the finger overlaps with the lens barrel 11, the warning beep is generated from the buzzer in the above embodiment. Besides this, however, a liquid crystal display may indicate an error, and warning light may be turned on in a viewfinder. Moreover, the detection electrode is provided at the top of the lens barrel. Besides this, the detection electrode may be provided so as to surround the outer periphery of the lens barrel.

Figure 16:
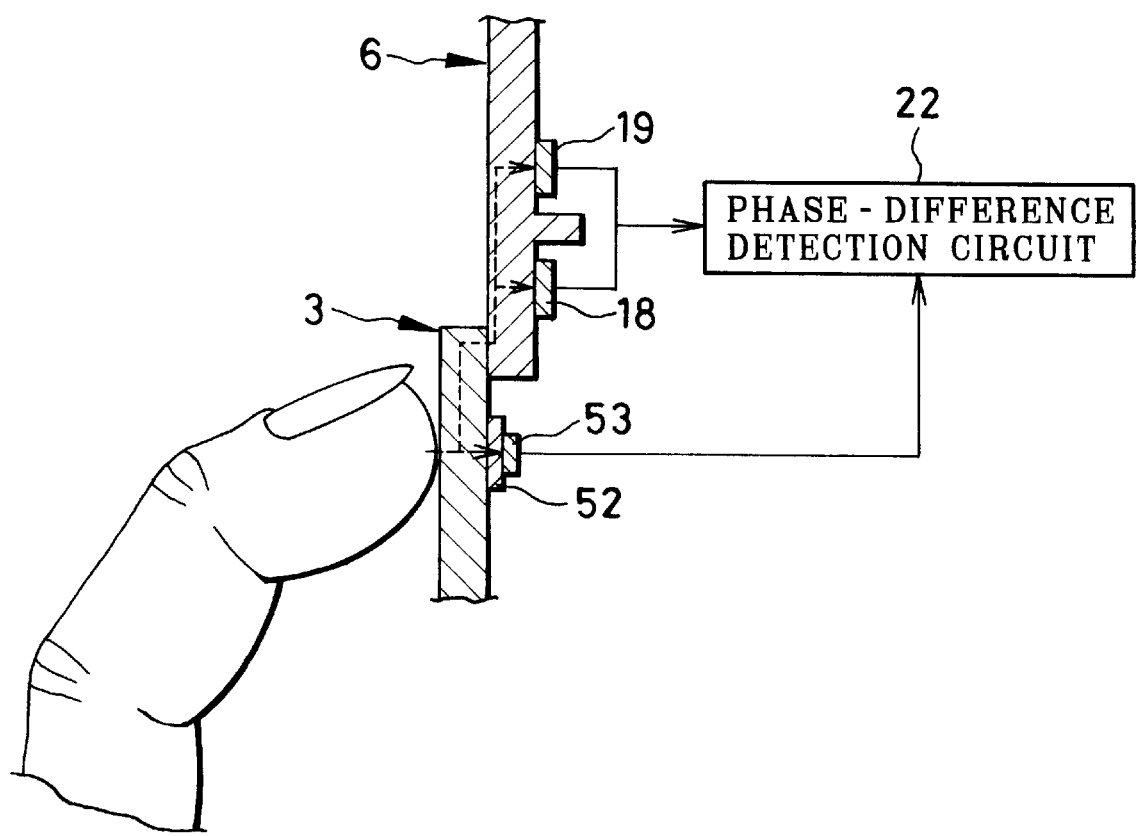
FIG. 16 is a partially sectional view of an embodiment in which an auxiliary electrode is provided.

In the phase-difference detection circuit of the above embodiment, the correction capacitor is incorporated to prevent mis-detection of the overlap of the finger. Otherwise, as shown in FIG. 16, a correction electrode 53 may be attached to the inside of the exterior cover 3 of the camera 2 via an insulating plate 52 having insulation properties. Owing to this, it is possible to prevent mis-detection in which mere hold of the camera 2 is detected as the overlap of the finger.

While the photographer holds the camera 2, capacitance of the photographer is applied to the correction electrode 53 via the exterior cover 3 and the insulating plate 52. When the finger overlaps with the lens barrier 6, the capacitance of the photographer is applied to the detection electrodes 18 and 19 via the lens barrier 6. The capacitance of the photographer applied to these electrodes changes in inverse proportion to a distance between the finger of the photographer and the electrode. Thus, capacitance applied to the correction electrode 53 by holding the camera 2 is slightly greater than the capacitance applied to the detection electrodes 18 and 19 from the photographer. In contrast, when the finger overlaps with the lens barrier 6, the capacitance applied to the detection electrodes 18 and 19 is greater than the capacitance applied to the correction electrode 53. Incidentally, the capacitance applied to the electrodes 18, 19 and 53 can be adjusted in accordance with sizes of the respective electrodes and mounting positions thereof.

Figure 17:
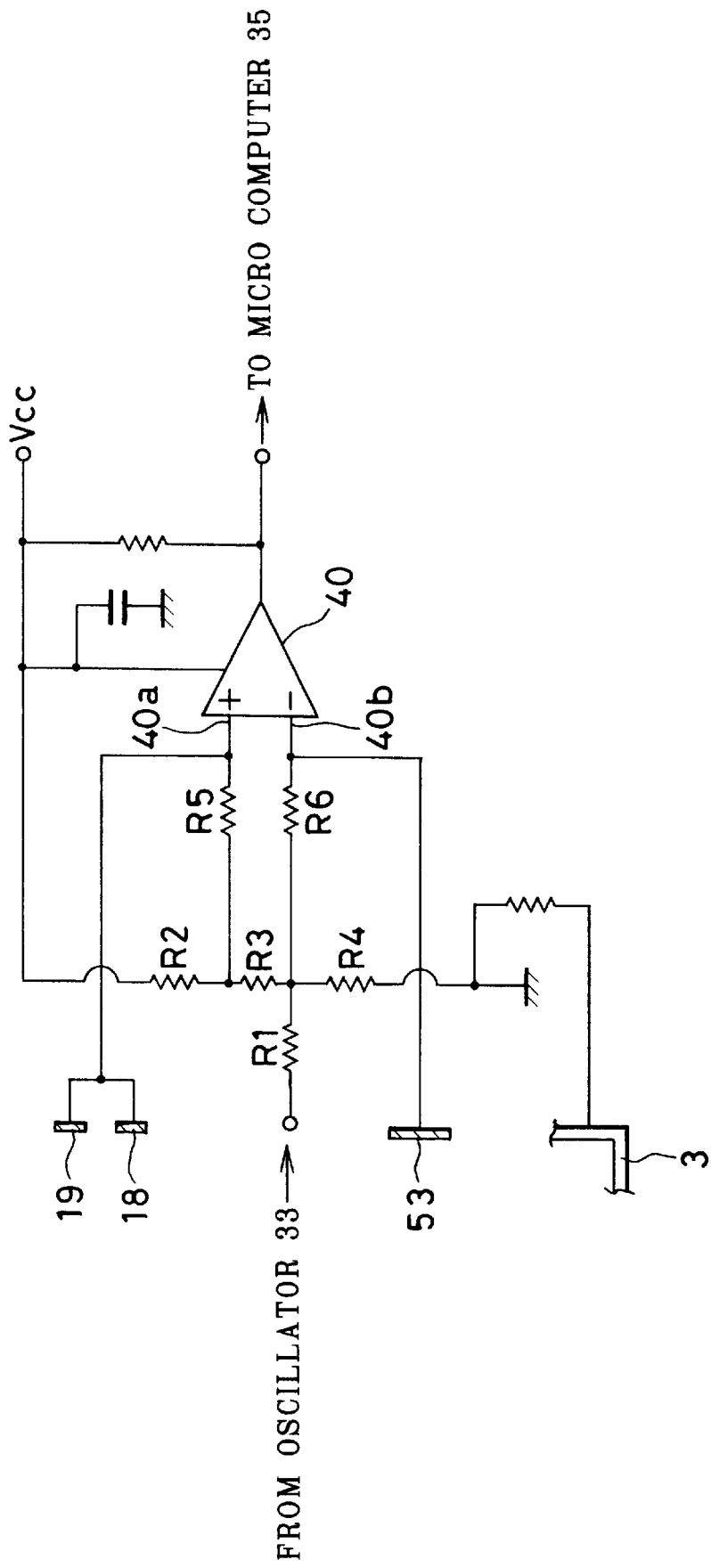
FIG. 17 is a circuit diagram of the phase-difference detection circuit of the embodiment in which the auxiliary electrode is provided.

With respect to the phase-difference detection circuit used in the present embodiment, such as shown in FIG. 17, the detection electrodes 18 and 19 are connected to the non-inverted input terminal 40a of the comparator 40, and the correction electrode 53 is connected to the inverted input terminal 40b. The delay circuit of the detection-side pulse signal is constituted of the resistance R5 and the capacitance of the detection electrodes 18 and 19. Meanwhile, the resistance R6 and the capacitance of the correction electrode 53 constitute the delay circuit relative to the reference-side pulse signal. A value of the resistance R6 is determined, taking account of the capacitance of the correction electrode 53 itself, such that the phase delay of the reference-side pulse signal is identical with or is slightly delayed rather than the phase delay of the detection-side pulse signal caused by the resistance R5 and the capacitance of the detection electrodes 18 and 19. Values of the resistances R1 through R4 are adjusted so as to keep a state in that the voltage Va of the detection-side pulse signal is slightly higher than the voltage Vb of the reference-side pulse signal (Va>Vb) when the camera 2 is not touched.

Hereinafter, the finger detection according to the present embodiment is described. When the oscillator 33 and the phase-difference detection circuit 22 are turned on, the oscillator 33 outputs the high-frequency pulse signal shown in FIG. 18A and having the right edge. The high-frequency pulse signal of the detection side is inputted into the non-inverted input terminal 40a via the resistance R5. The high-frequency pulse signal of the reference side is inputted into the inverted input terminal 40b via the resistance R6.

When the exterior cover 3 is not touched under the condition that the oscillator 33 and the phase-difference detection circuit 22 are turned on, the wave forms (changes of the voltages Va and Vb) of the respective pulse signals inputted into the input terminals 40a and 40b have rising edges being dull such as shown in FIG. 18B. Thus, the phases of the respective pulse signals before its peak voltage are delayed in comparison with the output of the oscillator 33. With respect to the detection-side pulse signal, the delay circuit is formed by the resistance R5 and the capacitance of the detection electrodes 18 and 19 themselves so that the rising edge of the detection-side pulse signal becomes dull. With respect to the reference-side pulse signal, the delay circuit is formed by the resistance R6 and the capacitance of the correction electrode 53 itself so that the rising edge of the reference-side pulse signal becomes dull. At this time, the overlap of the finger is not sensed, because the voltage Va of the detection-side pulse signal and the voltage Vb of the reference-side pulse signal are kept in the relationship of Va>Vb.

In a state that the photographer holds the camera 2 without touching the lens barrier 6, the capacitance of the photographer is applied to the correction electrode 53 via the exterior cover 3 and the insulating plate 52, and is applied to the detection electrodes 18 and 19 via the exterior cover 3 and the lens barrier 6. Owing to this, the rising edges of both of the detection-side pulse signal and the reference-side pulse signal become much duller than the rising edges shown in FIG. 18B. Hence, the phase before the peak voltage is further delayed. At this time, the size of the correction electrode 53 and the mounting position thereof are adjusted such that the capacitance applied to the correction electrode 53 is identical with or is slightly greater than the capacitance applied to the detection electrodes 18 and 19. Thus, the phase of the reference-side pulse signal before the peak voltage is identical with or is slightly delayed rather than the phase of the detection-side pulse signal, such as shown in FIG. 18C. Accordingly, the respective voltages are kept in the relationship of Va>Vb so that the overlap of the finger is not sensed.

Figure 19:
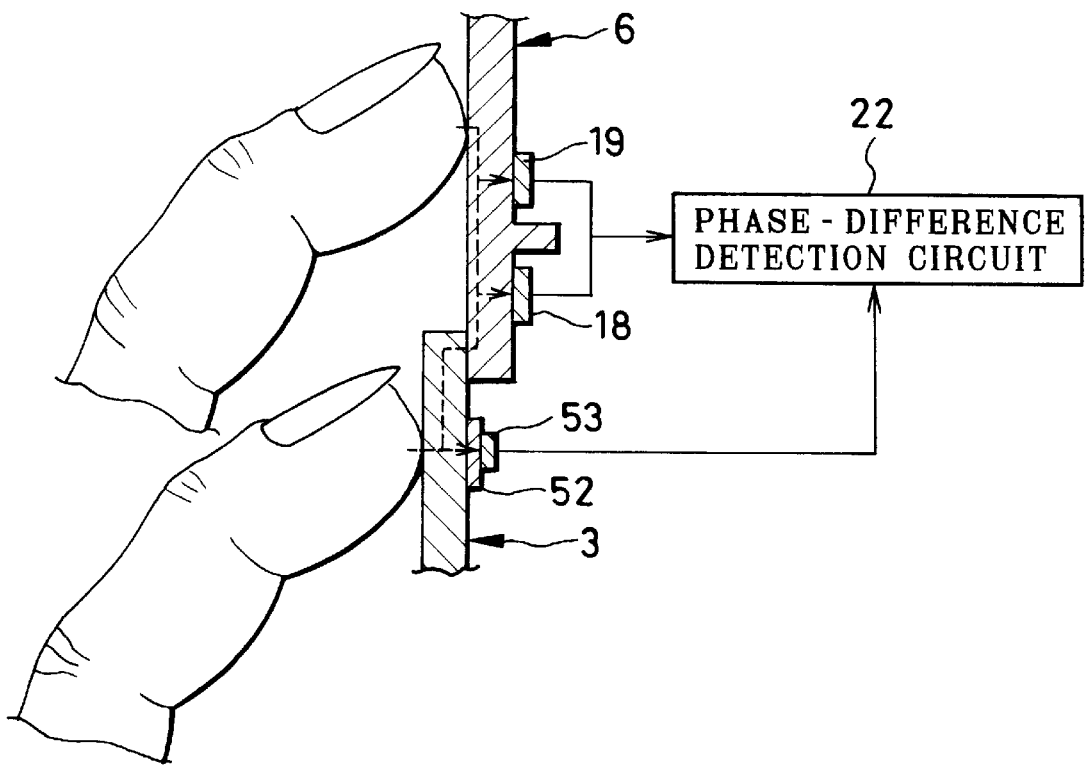
FIG. 19 is a partially sectional view showing a state in that the finger overlaps with the lens barrier when the auxiliary power source is provided.

In a state that the photographer holds the camera 2 so as to touch the lens barrier 6 such as shown in FIG. 19, the capacitance of the photographer is applied to the detection electrodes 18 and 19 through both routes, one of which is constituted of the photographer and the lens barrier 6, and the other of which is constituted of the photographer, the exterior cover 3 and the lens barrier 6. Moreover, the capacitance of the photographer is also applied to the correction electrode 53 through both routes, one of which is constituted of the photographer, the lens barrier 6, the exterior cover 3 and the insulating plate 52, and the other of which is constituted of the photographer, the exterior cover 3 and the insulating plate 52.

As to the capacitance applied via the lens barrier 6 to the detection electrodes 18, 19 and the correction electrode 53, the capacitance applied to the detection electrodes 18 and 19 is greater than the capacitance applied to the correction electrode 53. Thus, such as shown in FIG. 18D, when the finger touches the lens barrier 6, the rising edges of the detection-side pulse signal and the reference-side pulse signal become duller than the rising edges shown in FIG. 18C. Further, the detection-side pulse signal becomes duller than the reference-side pulse signal. In this way, the phase of the detection-side pulse signal before the peak voltage is delayed rather than the phase of the reference-side pulse signal before the peak voltage. Hence, at the time of pulse rising, the relationship between the voltages Va and Vb becomes Va<Vb. Thus, the detection signal from the comparator 40 changes from the H level to the L level so that the overlap of the finger is sensed.

As described above, upon providing the correction electrode 53, it is possible to detect the overlap of the finger, without mis-operation, by the capacitance of the photographer applied via the exterior cover 3 of the camera 2. In this case, the phase delay of the reference-side pulse signal can be corrected by changing a size and a position of the correction electrode. Accordingly, the circuit is freely planed and designed. Moreover, the capacitance of the correction electrode 53 itself and the applied capacitance are not affected by a change of temperature. Therefore, it is advantageous with regard to a change of environment in comparison with the case in that the correction capacitor 42 is used such as described in the foregoing embodiment.

Figure 20:
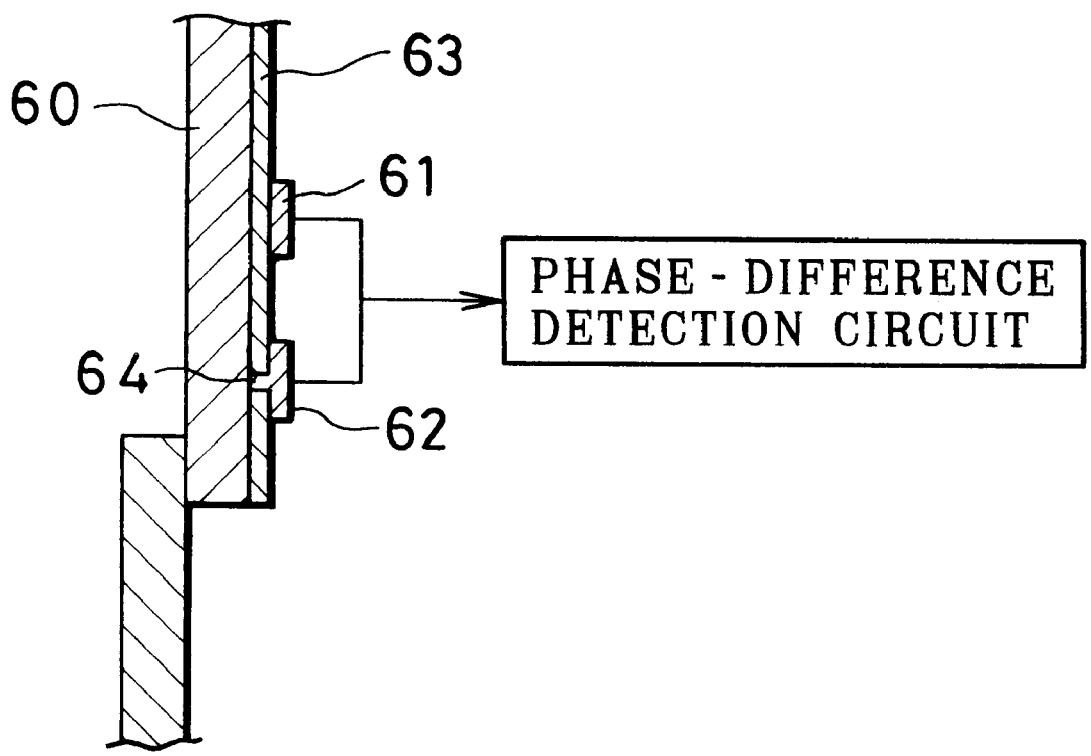
FIG. 20 is a partially sectional view showing the other embodiment with regard to a detection electrode.

By the way, in the above embodiments, the lens barrier 6 is formed from the non-conductive plastic. However, in case the lens barrier 6 is formed from a metal plate, a flexible plate 63 provided with detection electrodes 61 and 62 may be attached to the back of the lens barrier 60, as illustrated in FIG. 20. Further, the flexible plate 63 may be formed with a through hole 64 by which the detection electrode 62 directly contacts the lens barrier 60 to be electrically connected.

The camera explained in the above embodiments employs the exterior cover having the conductivity. However, the present invention may be applicable to a camera employing a non-conductive exterior cover. Especially, with respect to a camera in which a non-conductive exterior cover is employed and its camera body is made of aluminum die cast, various parts are attached to the conductive camera body. In such camera, metallic parts including a screw and so forth are bared to the outside. When a photographer holds this camera, the photographer touches the metallic parts, the screw and so forth. This is equivalent to that the photographer touches the camera body. In other words, the photographer touches the camera body via the screw and so forth. Thus, the capacitance of the photographer is applied to the detection electrode being adjacent to the camera body and surrounded therewith so that possibility of mistakenly warning the finger overlap increases. Also in such case, it is possible to apply the present invention.

As described above, the camera according to the present invention is provided with the finger detection device for detecting the finger overlapping with the lens barrier. In case the lens barrier is touched during its movement, the lens barrier is stopped or is moved to the open position. In virtue of this, it is possible to prevent the lens barrier from being damaged and catching the finger.

Moreover, the lens barrel is provided with the finger detection device for detecting the finger overlapping with the lens barrel. Thus, it is possible to prevent the lens barrel from being collapsed and protruded in the state that the finger touches the lens barrel. Further, it is possible to prevent the lens barrel from being damaged. Furthermore, when photographing is performed, it is possible to detect the finger overlapping with the top of the lens barrel so that mis-photographing due to the overlap of the finger may be prevented.

The lens barrel and the lens barrier may be driven by a single electric drive source, for example, by a single motor. In this case, the lens barrier is opened first by rotating the motor, and then, the lens barrel is protruded. When the lens barrel is collapsed, the lens barrier is closed after stop of the lens barrel. Further, the lens barrier may be opened and closed by a motor for focusing, and the lens barrel may be moved by a motor for zooming.

For example, in FIG. 3, two electrodes 18 and 19 are provided in order to enlarge an area of the electrodes. Thus, either of the electrodes 18 band 19 may be merely provide. Meanwhile, in case ends of the electrodes 18 and 19 are connected, it is sufficient to provide either of the segments 20 and 21.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a lens barrel, a lens barrier and at least one electric drive source for driving said lens barrel and said lens barrier, said lens barrel being protruded and collapsed between a collapsible-mount position where said lens barrel is contained in a camera body, and a protrusion position where said lens barrel is protruded through a lens-barrel orifice formed in the front of said camera body, said lens barrier covering said lens-barrel orifice when said lens barrel is set to said collapsible-mount position, and said lens barrier opening said lens-barrel orifice when said lens barrel is protruded toward said protrusion position, said camera comprising:

finger detection means for detecting a finger overlapping with said lens barrier;

wherein the finger detection means comprises a detection electrode attached to said lens barrier.

2. A camera according to claim 1, wherein said finger detection means further comprises:

an oscillator for generating a high-frequency pulse signal; and a phase-difference detection circuit for judging whether or not said lens barrier is touched by the finger, based on a signal from said detection electrode and said high-frequency pulse signal.

3. A camera according to claim 2, wherein said detection electrode is disposed on an inner face of said lens barrier and along a periphery thereof.

4. A camera according to claim 2, wherein said phase-difference detection circuit includes a comparator connected to said oscillator, said high-frequency pulse signal being inputted as a detection-side pulse signal into a first input terminal of said comparator via a first delay circuit, and said high-frequency pulse signal being inputted as a reference-side pulse signal into a second input terminal of said comparator via a second delay circuit, wherein a phase of said detection-side pulse signal precedes relative to a phase of said reference-side pulse signal when said lens barrier is averted from being touched by the finger.

5. A camera according to claim 4, wherein said detection electrode is connected to said first input terminal of said comparator, capacitance being applied to said first delay circuit via said detection electrode when said lens barrier is touched by the finger, and the phase of said detection-side pulse signal being delayed relative to the phase of said reference-side pulse signal.

6. A camera according to claim 5, wherein said comparator detects that the phase of said detection-side pulse signal is delayed relative to the phase of said reference-side pulse signal, by comparing voltages of said two pulse signals.

7. A camera according to claim 6, wherein said phase-difference detection circuit further comprises:

a correction capacitor connected to said second input terminal of said comparator, said correction capacitor adjusting the phase of said reference-side pulse signal to prevent mis-detection of the finger.

8. A camera according to claim 6, wherein said phase-difference detection circuit further comprises:

a correction electrode connected to said second input terminal of said comparator, said correction electrode adjusting the phase of said reference-side pulse signal to prevent mis-detection of the finger.

9. A camera according to claim 1, wherein said lens barrier is returned to a position for opening said lens-barrel orifice when overlap of the finger is detected by said finger detection means at a time of closing said lens-barrel orifice with said lens barrier.

10. A camera according to claim 1, wherein said lens barrier is stopped to move when overlap of the finger is detected by said finger detection means during movement of said lens barrier.

11. A camera according to claim 1, wherein said finger detection means detects the finger for a predetermined period when a main switch of said camera is turned on or is turned off.

12. A camera according to claim 1, wherein said finger detection means detects the finger while said lens barrier closes said lens-barrel orifice.

13. A camera according to claim 1, wherein said finger detection means detects the finger while said electric drive source is electrified.

14. A camera having a lens barrel, a lens barrier and at least one electric drive source for driving said lens barrel and said lens barrier, said lens barrel being protruded and collapsed between a collapsible-mount position where said lens barrel is contained in a camera body, and a protrusion position where said lens barrel is protruded through a lens-barrel orifice formed in the front of said camera body, said lens barrier covering said lens-barrel orifice when said lens barrel is set to said collapsible-mount position, and said lens barrier opening said lens-barrel orifice when said lens barrel is protruded toward said protrusion position, said camera comprising:

first finger detection means for detecting a finger overlapping with said lens barrier; and second finger detection means for detecting a finger overlapping with said lens barrel;

wherein the first finger detection means comprises a first detection electrode attached to said lens barrier, and wherein said second finger detection means comprises a second detection electrode attached to a decoration sheet of said lens barrel.

* * * * *